(12) United States Patent
Fujii et al.

(10) Patent No.: US 9,044,672 B2
(45) Date of Patent: Jun. 2, 2015

(54) GAME SYSTEM, GAME APPARATUS, STORAGE MEDIUM AND GAME CONTROLLING METHOD

(75) Inventors: Hideki Fujii, Kyoto (JP); Yusuke Akifusa, Kyoto (JP); Toshikazu Kiuchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 9 days.

(21) Appl. No.: 13/617,531

(22) Filed: Sep. 14, 2012

(65) Prior Publication Data

US 2013/0296044 A1 Nov. 7, 2013

(30) Foreign Application Priority Data

May 7, 2012 (JP) ................................. 2012-106270

(51) Int. Cl.
*A63F 13/426* (2014.01)
*A63F 13/40* (2014.01)

(52) U.S. Cl.
CPC ......... *A63F 13/10* (2013.01); *A63F 2300/1075* (2013.01); *A63F 2300/204* (2013.01); *A63F 2300/301* (2013.01); *A63F 2300/6045* (2013.01)

(58) Field of Classification Search
CPC .................... A63F 2300/204; A63F 2300/301; A63F 2300/6045; A63F 2300/6653
USPC ................................................ 463/30–35, 37
See application file for complete search history.

(56) References Cited

U.S. PATENT DOCUMENTS

2005/0153761 A1* 7/2005 Sterchi et al. ..................... 463/3

FOREIGN PATENT DOCUMENTS

JP 2006-221281 8/2006

OTHER PUBLICATIONS

The Legend of Zelda Phantom Hourglass manual, 2007.*
Preschool Connect the Dots—App Review video review uploaded by KidAppReviews on Feb. 14, 2010 and found at http://www.youtube.com/watch?v=1WKPUGDahM4 and associated screenshots from video.*

* cited by examiner

*Primary Examiner* — Ronald Laneau
*Assistant Examiner* — Ross Williams
(74) *Attorney, Agent, or Firm* — Nixon & Vanderhye, P.C.

(57) ABSTRACT

An example non-limiting game system includes a game apparatus to which a television is connected. There is provided with an input terminal device which functions as an input device of the game apparatus. The television is displayed with an information presenting screen, and an input screen in which a part of objects is omitted from the information presenting screen is displayed on an LCD of the input terminal device. A player inputs in the input screen a moving path for a player character such that an object to be acquired can be acquired and an object not to be acquired can be evaded. The player character moves according to the moving path that is input on the information presenting screen.

20 Claims, 14 Drawing Sheets (A) INFORMATION PRESENTING SCREEN 100

(B) INPUT SCREEN 200

(A) INFORMATION PRESENTING SCREEN 100

(B) INPUT SCREEN 200

(A) OBSTACLE OBJECT (MOVING)

(B) OBSTACLE OBJECT (STATE CHANGING)

(C) BACKGROUND PATTERN (LATTICE)

(D) BACKGROUND PATTERN (SHADOW)

GAME SYSTEM, GAME APPARATUS, STORAGE MEDIUM AND GAME CONTROLLING METHOD

CROSS REFERENCE OF RELATED APPLICATION

The disclosure of Japanese Patent Application No. 2012-106270 filed on May 7, 2012 is incorporated herein by reference.

FIELD

This application describes a game system, a game apparatus, a storage medium and a game controlling method, providing with two separate display portions.

SUMMARY

It is a primary object of the present embodiment to provide a novel game system, game apparatus, storage medium and game controlling method.

Another object of the present embodiment is to provide a game system, a game apparatus, a storage medium and a game controlling method, a game can be enjoyed in the game using a positional input while it is considered whether or not an input is correct.

A first embodiment is a game system comprising: a first display portion, a second display portion, a first image generating portion, a second image generating portion, a first display controlling portion, a second display controlling portion, a determining portion, and a game processing portion. The second display portion is separated from the first display portion, and provided with an input surface. The first image generating portion generates a first image of a virtual space. The second image generating portion generates a second image of the same virtual space in a manner that a drawing of at least a certain target object out of the target objects drawn in the first image is not performed. The first display controlling portion, displays the first image on the first display portion. The second display controlling portion displays the second image on the second display portion. The determining portion determines, according to an input to the input surface, whether or not an input position corresponds to a position of the certain target object. For example, it is determined whether or not the position corresponding to the input position is coincident with a displaying position of the certain target object or whether or not the position corresponding to the input position is included within a predetermined range including the displaying position of the certain target object. The game processing portion performs a game processing according to a determination result by the determining, portion.

According to the first embodiment, since the drawing of at least a certain target object out of the target objects' drawn in the first image is not performed, it is necessary for a player or user to perform an input such that the input position corresponds to the position of the certain target object. That is, in a game using a position input, it is possible to enjoy the game while it is considered whether or not the input is correct.

A second embodiment is according to the first embodiment, wherein the determining portion, determines., based on a successive position input to the input surface, whether or not an input path from a predetermined start position to a predetermined end position passes positions corresponding to the target objects. The game processing portion decides a game result according to a determination result by the determining portion.

According to the second embodiment, it is possible to enjoy a game while considering whether or not the input of the input path is correct.

A third embodiment is according to the second embodiment, wherein the target object to be determined by the determining portion is in a plural number, and the determining portion determines whether or not the input path passes die positions corresponding to the respective target objects.

According to the third embodiment, the target object are in a plural number, and it is determined whether or not die input path passes the positions corresponding to the respective target objects, and therefore, it is possible to enjoy a game that a degree of difficulty of the input for the input path becomes different in accordance with the number of the target objects.

A fourth embodiment is according to the second embodiment, wherein the target object to be determined by the determining portion is in a plural number and include a target object that the input path must pass and a target object that the input path must, not pass. For example, the target object to be passed is a target object that the input path passes to dear the game, and the target object not to be passed is a target object that the game is made to be a mistake if the input path passes the same. The determining portion determines whether or not the input path passes a position corresponding to the target object to be passed, and whether or not the input path, does not pass a position corresponding to the target object-not to be passed.

According to the fourth embodiment, it is necessary to Input such that the input path passes the target object to be passed and evades the target object not to be passed, and therefore, it is possible to play a game that a degree of difficulty is higher.

A fifth embodiment is according to the fourth embodiment, further comprising a moving object which moves on a path corresponding to the input path. Therefore, the determining portion determines whether or not the moving object moving on the path corresponding to the input path passes the position corresponding to the target object to be passed and whether or not the moving object does not pass a position corresponding to the target object not to be passed, In the fifth embodiment, as similar to the fourth embodiment, it is possible to play a game that a degree of difficulty is higher.

A sixth embodiment is according to the fifth embodiment, wherein the target object not to be passed includes a target object that a position thereof is changed.

According to the sixth embodiment, since the position of the target object not to be passed is changed, it is necessary to control a movement start timing of the moving object. Therefore, it is possible to enjoy a game that a degree of difficulty is farther higher.

A seventh embodiment is according to the fifth embodiment, wherein the target object not to be passed includes a target object that a state thereof is changed between a state that the input path must not pass and a state that the input path may pass.

According to the seventh embodiment, since the target object not to be passed is evaded or not evaded according to the state thereof, it is necessary to input the input path by taking the transition of the state into-consideration, and therefore, it is possible to enjoy a game that a degree of difficulty is further higher.

An eighth embodiment is according to the fifth embodiment, wherein the determining portion determines whether or not the moving object moving on the path corresponding to the input path passes the position corresponding the target object due to a special effect within the virtual space. For example, since a size and a shape of the moving object is deformed by the special effect, the moving object is made to easily pass the target object.

According to the eighth embodiment, the input path is input while it is considered whether or not the special effect is to be implemented, and therefore, it is possible to enjoy a game with more complexity.

A ninth embodiment is according to the second embodiment, wherein the target object to be determined by the determining portion is in a plural number, and includes a plurality-of target objects to each of which an order that at least the input path most pass is assigned. The determining portion determines at least whether or not the input path passes respective positions corresponding to the plurality of target objects to each of which art order that the input path mast pass is assigned in accordance with the order.

According to the ninth embodiment, it is necessary to also consider an order that the target objects are determined, and therefore, it is possible to enjoy a game with, a further higher degree of difficulty.

A tenth embodiment is according to the second, embodiment; wherein the second image generating portion draws the input path in the second image according to the input to the input surface, and the first image generating portion does not draw a path corresponding to the input path in the first image when the input path is drawn in the second path by the second image generating portion.

According to the tenth embodiment, at a time that the input path is to be input, the path corresponding to the input path is not drawn in the first image, and therefore, it is impossible to know whether or not the input path passes the position corresponding to the target object during the input of the input path, and accordingly, a degree of difficulty for inputting the input path can be made higher.

An eleventh embodiment is according to the first embodiment, wherein the second display controlling portion transmits image data corresponding to the second image to the second display portion in a wireless manner.

According to the eleventh embodiment, the second display portion is connected in a wirelessly communication-capable manner, and therefore, it is possible to perform the input to the input surface of the second, display portion at hand while seeing the first display portion at a slightly separate position, for example. That is, it becomes easy to operate.

A twelfth embodiment is according to the first embodiment, further comprising a game apparatus connected to the first display portion and an input terminal device which is connected to the game apparatus in a communication-capable manner and includes the second display portion.

According to the twelfth embodiment, the first display portion is connected to the game apparatus, and the input terminal device which is connected to the game apparatus in a communication-capable manner is provided with the second display portion, and therefore, as similar to the eleventh embodiment, it becomes easy to operate.

A thirteenth embodiment is a game apparatus used in a game system comprising a first display portion and a second display portion, separate from the first display portion and provided with an input-surface, the game apparatus comprises a first image generating portion which generates a first image of a virtual space; a second image generating portion which generates a second image of the virtual space in a manner that a drawing of at least a certain target object out of the target objects drawn in the first image is not performed; a first display controlling portion which displays the first image on the first display portion; a second display controlling portion which displays the second image on the second display portion; a determining portion which determines, according to an input to the input surface, whether or not an input position corresponds to a position of the certain target object; and a game processing portion which performs a game processing according to a determination result by the determining portion.

A fourteenth embodiment is a non-transitory storage medium storing a game program for a game system comprising a first display portion and a second display portion that is separate from the first display portion and provided with an input surface, the game program causes a computer of the game system to function as a first image generating portion which generates a first image of a virtual space; a second image generating portion which generates a second image of the virtual space in a manner that a drawing of at least a certain target object out of the target objects drawn m the first image is not performed; a first display controlling portion which displays the first image on the first display portion; a second display controlling portion which displays the second image on the second display portion; a determining portion which determines, according to an input to the input surface, whether or not an input position corresponds to a position of the certain target object; and a game processing portion which performs a game processing according to a determination result by the determining portion.

A fifteenth embodiment is a game controlling method for a game system comprising a first display portion and a second display portion that is separate from the first display portion and provided with an input surface, a computer of the game system performs (a) generating a first image of a virtual space; (b) generating a second image of the virtual space by controlling not to draw at least a part of target objects drawn in the first image; (c) displaying the first image on the first display portion: (d) displaying the second image on the second, display portion; (e) determining, according to an input, to the input surface, whether or not an input position corresponds to a position of the part of the target objects; and (f) performing a game processing according to a determination result in the step (e).

In thirteenth to fifteenth embodiments, similar to the first embodiment, it is possible to enjoy a game while considering whether or not the input is correct.

The above described objects and other objects, features, aspects and advantages of the embodiments will become more apparent from the following detailed description when taken in conjunction with the accompanying drawings.

DETAILED DESCRIPTION OF NON-LIMITING EXAMPLE EMBODIMENTS

Figure 1:
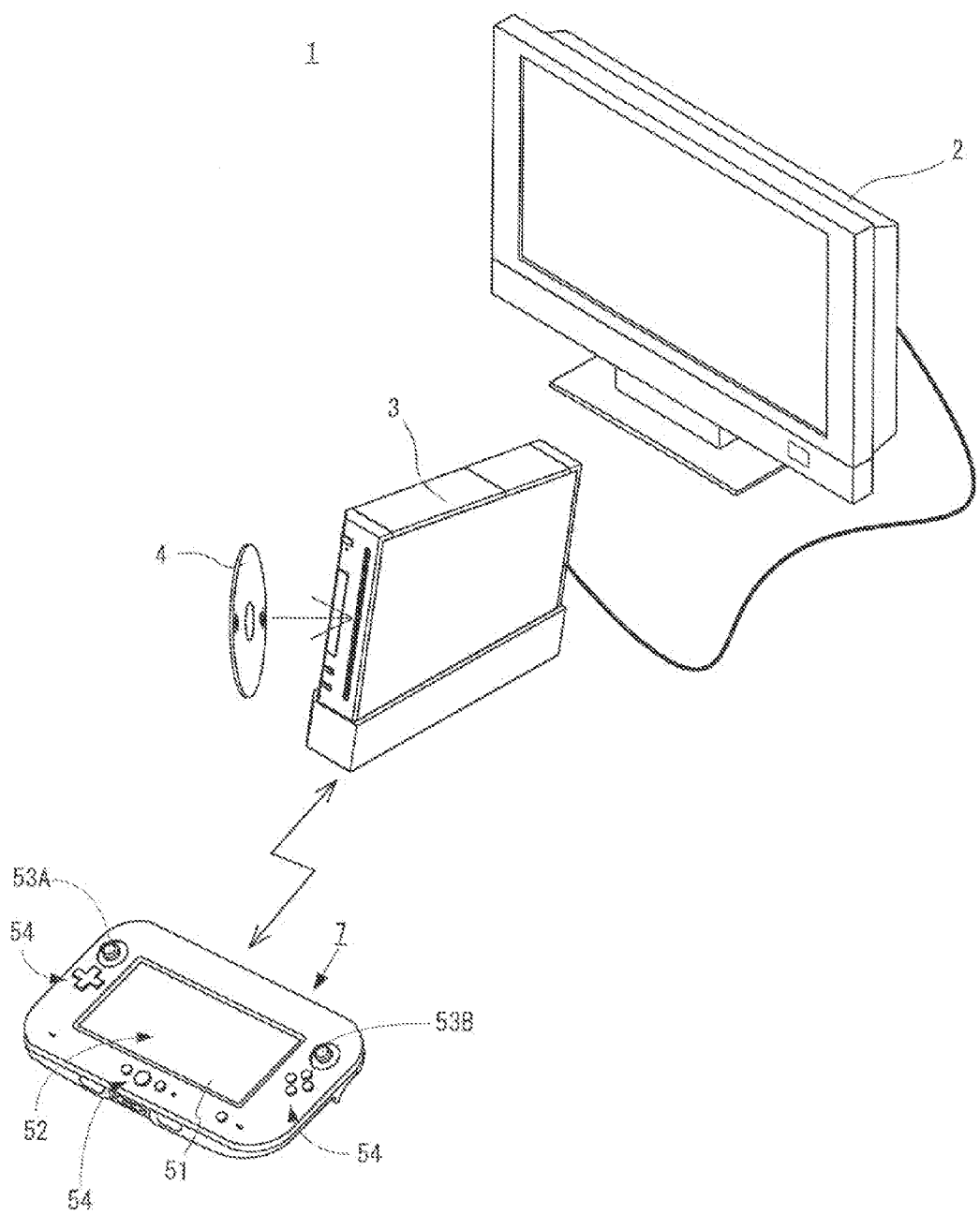
FIG. 1 is an appearance view of an example non-limiting game system.

A game system 1 according to an example non-limiting embodiment is described with reference to drawings below. The game system 1 shown in FIG. 1 includes a stationary type display device typified by a television receiver or the like (hereinafter, referred to as "television") 2, a console-type game apparatus 3, an optical disk 4 and an input terminal device 7. The game system 1 is for executing game processing in the game apparatus 3 based on game operations by using the input terminal device 7, and displaying game images obtained by the game processing on the television 2 and/or the input terminal device 7.

Into the game apparatus 3, the optical disk 4 being one example of an information storage medium that is used to fee replaceable with respect to the game apparatus 3 is loaded. In the optical disk 4, an information processing program (typically, an application program, such as a game program) to be executed, in the game apparatus 3 is stored. The game apparatus 3 executes game processing by reading and executing the information processing program stored in the optical disk 4 loaded into a loading slot provided on a front surface thereof.

To the game apparatus 3, the television 2 is connected via a connection cord. The television 2 displays a game image obtained through the game processing executed by the game apparatus 3. The television 2 has a speaker 2a (FIG. 2), and the speaker 2a outputs game sounds obtained as a result of the game processing described above.

Here, in another embodiment the game apparatus 3 and the stationary-type display may be integrally formed with each other. Furthermore, communications between the game apparatus 3 and the television 2 may be performed, wirelessly.

The input terminal device 7 transmits and receives data with at least the game apparatus 3. The user (player) can use the input terminal device 7 by moving with his or her hands, and by placing the input terminal device 7 at an arbitrary position. Although a detailed description will be made later, the input terminal device 7 has a displaying means such as an LCD 51 and an inputting means such as a touch panel 52, analog pads 53A and 53B and an operating button 54. The input terminal device 7 can communicate with the game apparatus 3 through a wireless communication using a technique of Bluetooth (registered trademark), for example. However, the input terminal device 7 and the game apparatus 3 may be connected to each other by a cable or wire. The input terminal device 7 receives from the game apparatus 3 data of an image (game, image, for example) generated in the game apparatus 3, and displays the image on the LCD 51. Furthermore, the input terminal device 7 transmits to the game apparatus 3 operation data indicating a content of the operation performed on the users own device.

It should be noted that in this embodiment, an LCD is employed as a display device, but the input terminal device 7 may include another arbitrary display device such as a display using EL (Electro Luminescence), for example.

Additionally, in FIG. 1, the number of input terminal devices 7 included in the game system 1 is one, but the game apparatus 3 can communicate with a plurality of input terminal devices 7, and a predetermined, number of input terminal devices 7 are simultaneously used to allow a plurality of number of players to play a game.

Figure 2:
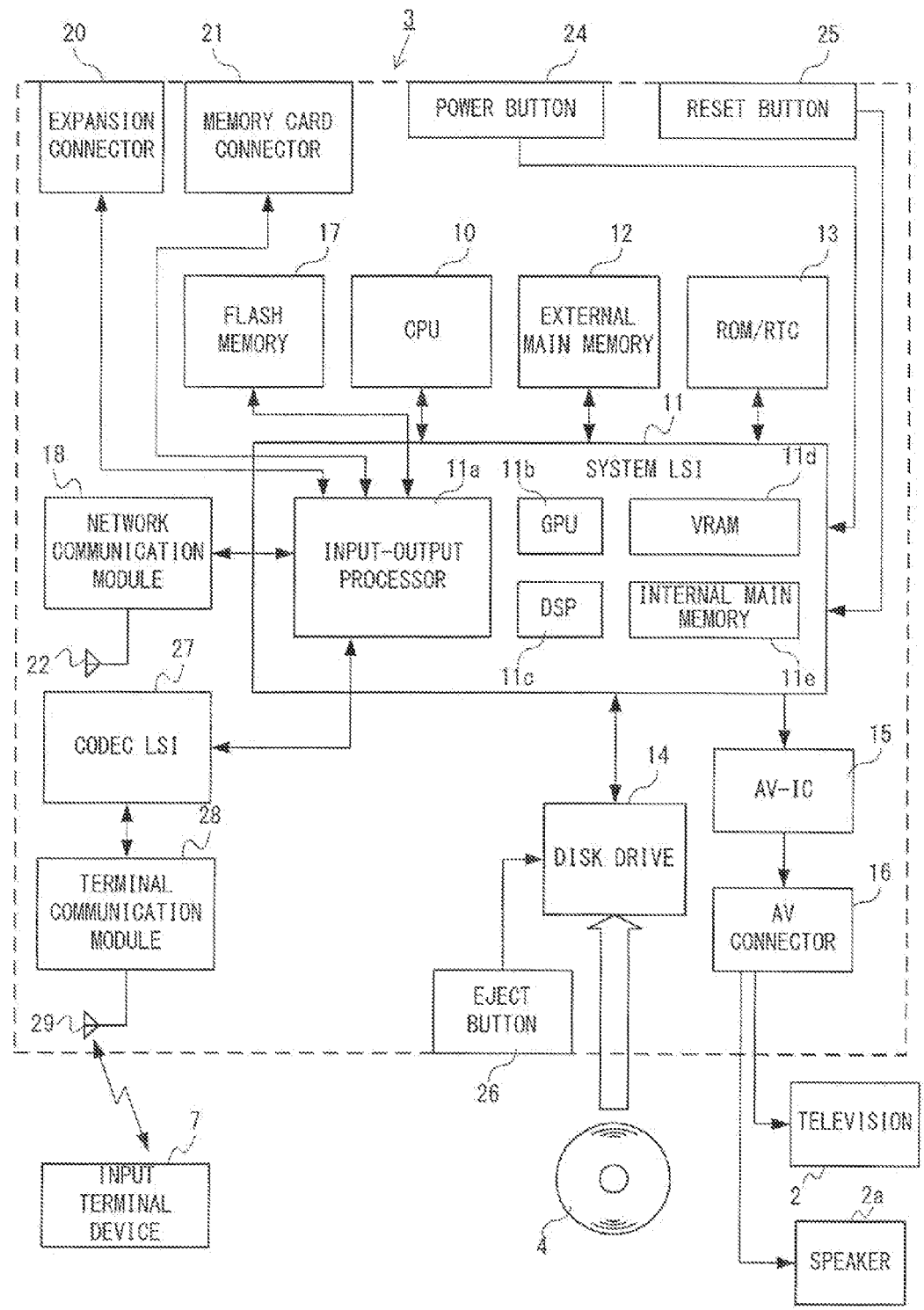
FIG. 2 is a block diagram showing an example non-limiting electric configuration of a game apparatus.

FIG. 2 is a block diagram showing an example non-limiting electric configuration of a game apparatus 3. The game apparatus 3 has a CPU 10, a system LSI 11, an external main memory 12, a ROM/RTC 13, a disk drive 14, an AV-IC 15, etc.

The CPU 10 is for executing game processing by executing the game program stored in the optical disk 4, and functions as a game processor. The CPU 10 is connected to the system LSI 11. The system LSI 11 is connected with the external main memory 12, the ROM/RTC 13, the disk drive 14 and the AV-IC 15 other than the CPU 10. The system LSI 11 performs processing of controlling data transfer between the respective components connected thereto, generating images to be displayed, acquiring data from external devices, and so on.

The external main memory 12 being volatile is for storing programs such as a game program read from the optical disk 4, a game program, etc. read from the flash memory 17, storing various data, and is utilized as a working area and a buffer area for the CPU 10. The ROM/RTC 13 has a ROM (so called a boot ROM) including a program for activating the game apparatus 3 and a clock circuit (RTC) for counting a time. The disk drive 14 reads program data, texture data, etc. from the optical disk 4, and writes the read data to an internal main memory 11e described later or the external main memory 12.

The system LSI 11 is provided with, an input-output processor (I/O processor) 11a, a GPU 11b, a DSP 11c, a VRAM 11d, and the internal main memory 11e. Although, illustration is omitted, these components 11a-11e are connected with each other by internal buses.

The GPU 11b is constructed of a part of a depicting means, and generates image data according to a graphics command from the CPU 10. Here, data such as polygon data, texture data, etc. is stored in the VRAM 11d, and the GPU 11b generates the image data, by using such the data. In this embodiment, the game apparatus 3 generates both of a game image to be displayed on the television 2 and a game image to be displayed on the input terminal device 7. Hereinafter, the game image displayed on the television 2 may be called as "television game image", and the game image displayed on the input terminal device 7 may be called as "terminal game image".

The DSP 11c functions as an audio processor, and generates sound data by using sound data and sound waveform (tone) data stored in the internal main memory 11e and the external main memory 12. In this embodiment, with respect to the game sound, as similar to the game image, both of a game sound to be output from the speaker of the television 2 and a game sound to be output from the speaker of the input terminal device 7 are generated. Hereinafter, the game sound output from the television 2 may he called as "television game sound", and the game sound output from the input terminal device 7 may be called as "terminal game sound".

As described above, data of images and sounds (including sound effect, game music, etc. This holds, true below,) to be output to the television 2 out of the images and sounds generated in the game apparatus 3 are read by the AV-IC 15. The AV-IC 15 outputs the read image data to the television 2 via the AV connector 16, and outputs the read sound data to the speaker 2*a* integrated in the television 2. Thus, an image is displayed on the television 2 while a sound is output from the speaker 2*a*.

Also, data of images and sounds to be output by the input terminal device 7 out of the images and sounds generated in the game apparatus 3 are transmitted to the input terminal, device 7 by the input-output processor 11*a*, etc. The data transmission to the input terminal device 7 by the input-output processor 11*a*, etc. is described later.

The input-output processor 11*a* executes data transmission and reception, with the components connected thereto, and executes downloading data from external devices. Also, the input-output processor 11*a* is connected to the flash memory 17, a network communication module 18, a controller communication module 19, an expansion connector 20, a memory card connector 21, and a codec LSI 27. Furthermore, the network communication module 18 is connected with an antenna 22. He controller communication module 19 is connected with an antenna 23. The codec LSI 27 is connected to a terminal communication module 28, and the terminal communication module 28 is connected with an antenna 29.

The input-output processor 11*a* can be connected to networks like the internet, etc, via the network communication module 18 and the antenna 22, and communicate with external information processing apparatuses (other game apparatuses, various server and so on, for example) being connected to the network, The input-output processor 11*a* periodically accesses the flash memory 17 to detect the presence or absence of data required to be transmitted to the network, and if the data is present, transmits the data to the network via the network communication module 18 and the antenna 22.

Also, the input-output processor 11*a* receives data transmitted from external information processing apparatuses and data downloaded from a download server via the network, the antenna 22 and the network communication module 18, and stores the received data in the flash memory 17.

The CPU 10 executes the game program, to thereby read the data stored in the flash memory 17 so as to use the data hi the game program, in the flash memory 17, other than the data to be transmitted and received between the game apparatus 3 and the external information processing apparatuses, save data (result data or proceeding data of the game) of the game played by using the game apparatus 3 may be stored. Also, in the flash memory 17, the game program may be stored.

Also, the game apparatus 3 can transmit and receive data of images or videos, sounds audio, etc, to and from the input terminal device 7. The input-output processor 11*a* outputs the data of the game image generated by the GPU 11*b* to the codec LSI 27 if transmitting the game image (game image for terminal) to the input terminal device 7. The codec LSI 27 performs predetermined compression processing on the image data from the input-output processor 11*a*. The terminal communication module 28 communicates with the input terminal, device 7 wirelessly. Accordingly, the image data compressed by the codec LSI 27 is transmitted to the input terminal device 7 via the antenna 29 by the terminal communication module 28. In this embodiment, the codec LSI 27 compresses the Image data by using efficient compression technique, such as H.264 standard, for example.

It should be noted that a compression technique except for it may be used, and the image data may be adapted to be transmitted without being compressed if the communication speed is enough high.

Furthermore, the terminal communication module 28 is a communication module that obtains Wi-Fi certification, for example, and may use a MIMO (Multiple input Multiple Output) technique employed in IEEE802.11n standard, for example, to thereby make high speed wireless communications with the input terminal device 7, or may use other communication systems.

In addition, the game apparatus 3 transmits sound data to the input terminal device 7 besides the image data. That is, the input-output processor 11*a* outputs the sound data generated by the DSP 11*c* to the terminal communication module 28 via the codec LSI 27. The codec LSI 27 also performs the compression processing out the sound data similar to the image data. The compression format of the sound data may be of any format. In another embodiment, the sound data may be transmitted without being compressed. The terminal communication module 28 transmits the compressed image data and sound data to the input terminal device 7 via the antenna 29.

Additionally, the game apparatus 3 can receive various data from the input terminal device 7. Although the detail is described later, in this embodiment, the input terminal, device 7 transmits operation data, image data, and sound data. Each data transmitted from the input terminal device 7 is received by the terminal communication module 28 via the antenna 29. Here, the image data and the sound data from the input terminal device 7 undergoes compression processing similar to the image data and the sound data from the game apparatus 3 to the input terminal device 7.

Accordingly, the image data and the sound data are transmitted from the terminal communication module 28 to the codec LSI 27, then undergo expansion processing by the codec LSI 27, and output to the input-output processor 11*a*.

Figure 3:
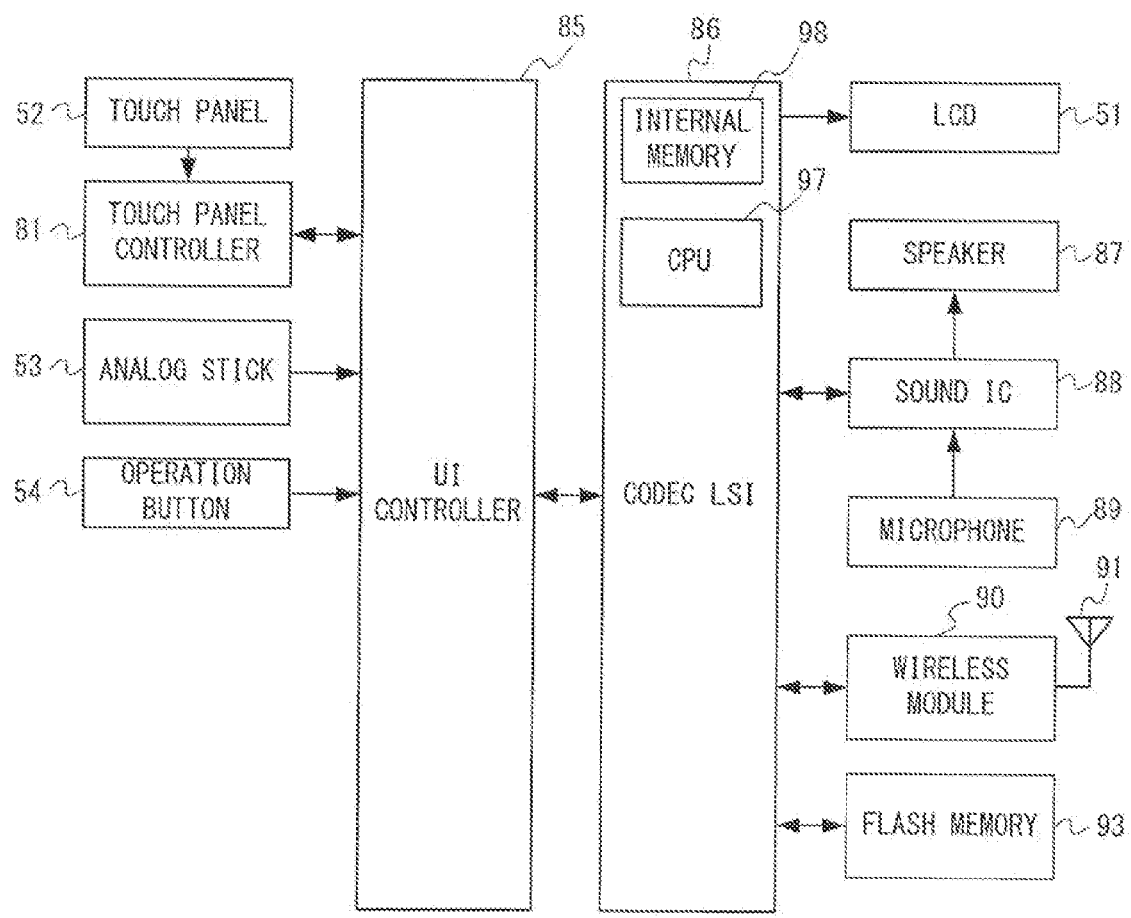
FIG. 3 is a block diagram showing an example non-limiting electric configuration of an input terminal device.

In addition, the image data from the input terminal device 7 includes image data corresponding to photographed image photographed by a camera not shown and so on, the sound data from the input terminal device 7 includes sound data corresponding to sounds (voice, hand clapping, etc.) that is generated by the player and detected by a microphone 89 (see FIG. 3).

On the other hand, the operation data from the input terminal device 7, which has less data than images and sounds, may not be required to undergo the compression processing. Also, it may be encoded as required or may not be encoded. Accordingly, the operation data is received in the terminal communication module 28, and then output to the input-output processor 11*a* via the codec LSI 27. The input-output processor 11*a* stores (temporarily stores) the data received from the input terminal device 7 in the buffer area of the internal main memory 11*e* or the external main memory 12.

Furthermore, the game apparatus 3 can connect to another appliance and an external storage. That is, the input-output processor 11*a* is connected with the expansion connector 20 and the connector for memory card 21. The expansion connector 20 is a connector for interfaces such as USB, SCSI. The expansion connector 20 can be connected with storage medium such as an external storage and connected with peripheral devices of other controllers, etc., and can make communication with networks in place of the network communication module 18 by being connected with a wired connector for communication.

The memory card connector 21 is a connector for being connected, with an external storage such as a memory card. For example, the input-output processor 11a can access the external storage via the expansion connector 20 and the connector for memory card 21, and can store data in the external storage and read data from the external storage.

The game apparatus 3 is provided with a power button 24, a reset button 25, and an eject button 26. The power button 24 and the reset button 25 are connected to the system LSI 11. When, the power button 24 is turned on, electric power is supplied to the respective components of the game apparatus 3 from an external power source by an AC adapter not shown. When the reset button 25 is pushed, the system LSI 11 restarts an activation program of the game apparatus 3. The eject button 26 is connected to the disk drive 14. When the eject button 26 is pushed, the optical disk 4 is ejected from the disk drive 14.

It should be noted that in another embodiment, some components contained in the game apparatus 3 may be configured as an expansion unit separately from the game apparatus 3. At this time, the expansion unit may be connected to the game apparatus 3 via the aforementioned expansion connector 20, for example.

FIG. 3 is a block diagram showing an example non-limiting electric configuration of the input terminal device 7. As shown in FIG. 3, the input terminal device 7 has a touch panel controller 81, a user interface controller (UI controller) 85, a codec LSI 86, the speaker 87, a sound IC 88, a microphone 89, a wireless module 90, an antenna 91 and a flash memory 93 besides the components shown in FIG. 1. These electronic components are mounted on an electronic circuit board and contained in the housing 50.

Although illustration is omitted, the input terminal device 7 is supplied with power from an integrated battery or an external power source.

The UI controller 85 is a circuit for controlling an input and an output of data to and from various input-output portions. The UI controller 85 is connected with the touch panel controller 81, the analog stick 53 (analog sticks 53A and 53B), and the operation button 54. Also, the UI controller 85 is connected to the codec LSI 86.

The touch panel controller 81 is connected to the touch panel 52, and is a circuit for performing a control on the touch panel 52. The touch panel controller 81 generates touched position data in a predetermined format on the basis of a signal from the touch panel 52 and outputs it to the UI controller 85. The touched position data, represents coordinates of the position (touched position) where an input is made on an input surface of the touch panel 52.

Here, the touch panel controller 81 performs reading signals from the touch panel 52 and generation of touched position data each predetermined time. Furthermore, from the UI controller 85 to the touch, panel controller 81, various control Instructions with respect to the touch panel 52 are output.

The analog stick 53 outputs stick data representing a direction in which the stick portion to be operated by the fingers of the user is slid (or tilted) and an amount of the sliding to the UI controller 85. Furthermore, the operation button 54 outputs operation button data representing an input status (whether to be pushed or not) with respect to each operation button to the UI controller 85.

The UI controller 85 outputs operation, data including the touched position data, the stick data, the operation button, data, the bearing azimuth data, the acceleration data. and the angular velocity data from the respective components described above to the codec LSI 86.

The codec LSI 86 is a circuit for perforating compression processing on data to he transmitted to the game apparatus 3 and expansion processing on the data transmitted from the game apparatus 3. The codec LSI 86 is connected with the LCD 51, the sound IC 88, the wireless module 90, and the flash memory 93. Also, the codec LSI 86 includes a CPU 97 and an infernal memory 98.

The input terminal device 7 is adapted so as not to perform the game processing itself, but need to execute a minimum program for management and communication of the input terminal device 7. When the power is turned on, the CPU 97 reads the program stored in the flash memory 93 into the internal memory 98 and executes it to thereby activate the input terminal device 7. Here, the input terminal device 7 is activated and suspended on the basis of operation data for the game apparatus 3. It should be noted that in this embodiment, the suspension of the input terminal device 7 means a sleep state in which power is supplied to a part of the circuit components (UI controller 85, codec LSI 86 and wireless module 90). In addition, a partial area of the internal memory 98 is used as a VRAM for the LCD 51.

The sound IC 88 is connected to the speaker 87 and the microphone 89, and is a circuit for controlling an input and output of sound data to and from the speaker 87 and the microphone 89. That is, in a case that sound data is received from the codec LSI 86, the sound IC 88 outputs a sound signal obtained by performing D/A conversion on the sound data to the speaker 87, to thereby make the speaker 87 output a sound. Also, the microphone 89 detects sound (voices and cracks, etc. of the user) propagated to the input terminal device 7, and outputs a sound signal Indicating the sound to the sound IC 88. The sound IC 88 performs A/D conversion on the sound signal front, the microphone 89, and outputs the sound data in the predetermined format to the codec LSI 86.

The codec LSI 86 transmits to the game apparatus 3 the image data from the camera, the sound data from the microphone 89, and the operation data from the UI controller 85 via the wireless module 90. In this embodiment, the codec LSI 86 performs compression processing on the Image data and the sound data similar to the codec LSI 27. The operation data and the compressed image data and sound data described above are output to the wireless module 90 as transmission data.

The wireless module 90 is connected with the antenna 91, and the wireless module 90 transmits the aforementioned transmission data to the game apparatus 3 via the antenna 91. The wireless module 90 has a function similar to the terminal communication module 28 of the game apparatus 3. That is, the wireless module 90 has a function of connecting to the wireless LAN following the system based on the IEEE 802.11n standard, for example. The data to be transmitted may be encoded as required or may not be encoded.

As described above, in the transmission data transmitted from the input terminal device 7 to the game apparatus 3, the operation data, the image data and the sound data are included.

As described above, the input terminal device 7 has the operating means such as the touch panel 52, the analog stick 53, and the operation button 54, but may be adapted to have other operating means in place of these operating means, or with these operating means in another embodiment. For example, as sensors for evaluating a motion (including a position and posture, or changes the position and the posture), at least one of a magnetic sensor, an acceleration sensor and a gyro sensor may be provided.

Additionally, the input terminal device 7 is configured to have the camera and the microphone 89, but in another embodiment, it may not have the camera and the microphone 89, or may have either one of them.

Hero, an example of an application (virtual game) executed in such a game system 1 will be described. In this embodiment, a player or user inputs a path (locus) from the start to the goal on the input screen displayed on the input terminal device 7 while seeing the information presenting screen displayed on the television 2. The information presenting screen showing a manner that a player object or player character (hereinafter, called as "player character") moves in accordance with the path input (input path) is displayed. The player character is thus moved in accordance with the input path, and therefore, the path input by the player may be called as "movement path".

If and when the player character reaches a goal with, getting all of predetermined objects, the game is cleared. On the other hand, if it is determined that the player character has made a mistake at a time that a vital value becomes equal to or less than zero (0), or that the player character hits (is brought into contact with) an obstacle ("obstacle object 130" described later), or that a kind of object ("order object 122" described later) to be gotten in an order is gotten in a wrong order.

Although the vital, value of the player character is reduced due to the movement thereof, by getting a fruit object, the vital value is restored (increased).

If and when the virtual game of this embodiment is started, an information presenting screen 100 as shown in FIG. 4(A) is displayed on a monitor of the television 2, and an input screen 200 as shown in FIG. 4(B) is displayed on an LCD 51 of the input terminal device 7, In the information presenting screen 100 shown in FIG. 4(A), a player character 102 is displayed at the lower right. The player character 102 is displayed on a circle-shape object (start object) 110 for indicating the start position of the movement. In the information presenting screen 100, at the upper left, an object (goal object) 112 for indicating the end position of the movement of the player character 102 is displayed.

Furthermore, in the information presenting screen 100, objects (120,122) that the player character 102 must get and an object (obstacle object) 130 being an obstacle to the movement of the player character 102 are displayed. The objects (120, 122) that the player character 102 mast get are classified into a normal object imitating a bruit (hereinafter, called as "normal, object") 120 and an object imitating a fruit to which a flag showing a number is stuck (hereinafter, called as "order object") 122.

In an example shown in FIG. 4(A), four (4) normal objects 120 (120*a*, 120*b*, 120*c*, 120*d*) are displayed and two (2) order objects 122 (122*a*, 122*b*) are displayed. The normal object 120 may not be displayed and one or more normal objects 120 may be displayed. Furthermore, the order object 122 may not be displayed, but in a case that the order object is to be displayed, two or more objects are to be displayed.

Furthermore, as shown in FIG. 4(A), in the information presenting screen 100, two (2) obstacle objects 130 are displayed. In the example shown in FIG. 4(A), the obstacle objects 130 imitating a black hole or pit hall are displayed.

On the other hand, on the LCD 51 of the input terminal device 7, the input screen 200 as shown m FIG. 4(B) is displayed. In the input screen 200, a player character 202 is displayed at the lower right. The player character 202 is displayed on the start object 210. Furthermore, in the input screen 200, at the upper left, the goal object 212 is displayed.

As seen from FIG. 4(A) and FIG. 4(B), as for the information presenting screen 100 and the input screen 200, the image data are respectively generated by taking the same virtual space with different virtual cameras. However, the respective virtual cameras are located at the same or at substantially the same position in the virtual space. In addition, in generating the image data for the input screen 200, an image drawing process of the normal object 120, the order object 122 and the obstacle object 130 are not performed. Therefore, as described above, in the input screen 200, only the player character 202, the start object 210 and the goal object 212 are displayed.

In addition, the player character 202, the start object 210 and the goal object 212 displayed on the input screen 200 of FIG. 4(B) are the same as the player character 102, the start object 110 and the goal object 112 displayed on the information presenting screen 100 of FIG. 4(A), respectively.

Furthermore, a coordinate system is the same in the information presenting screen 100 and the input screen 200. Therefore, as described later, in drawing a movement path 140 corresponding to the movement path 222 drawn in thee input screen 200, it is unnecessary to perform a coordinate converting process or the like. However, it is necessary to make the same a coordinate system of a display screen of the LCD 51 and a coordinate system of a detecting surface of the touch panel 52.

As described above, in this embodiment shown, the player draws the locus (the movement path of the player character 102) by touch input (slide operation) in the input screen 200. Also described above, in this input screen 200, the normal object 120, the order object 122 and the obstacle object 130 are not displayed. Therefore, for example, the player draws the movement path while seeing the information presenting screen 100 such that the obstacle object 130 can be evaded and all the normal object 120 and order object 122 can be gotten ("eaten" in this embodiment) by the player character 102.

Figure 4:
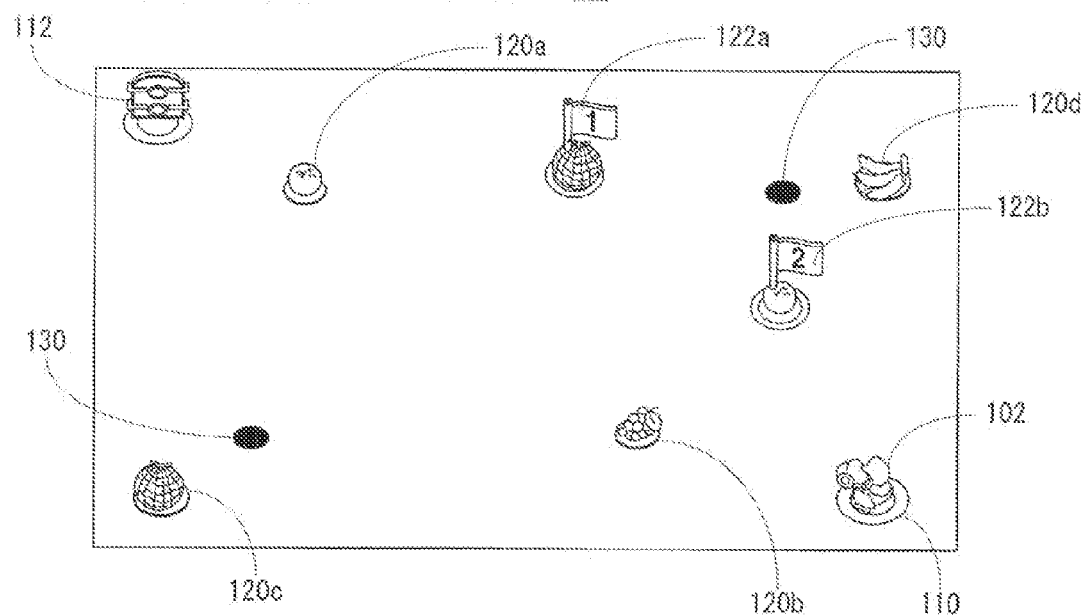
FIG. 4 is a view showing an example non-limiting information presenting screen on a television, and an example non-limiting input screen on as input terminal device.
Figure 4:
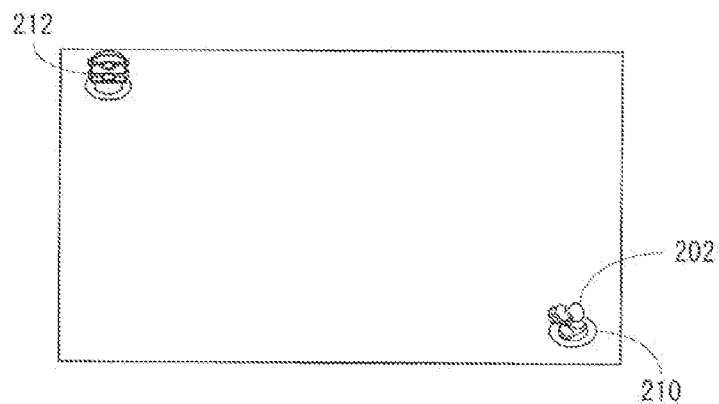
Figure 5:
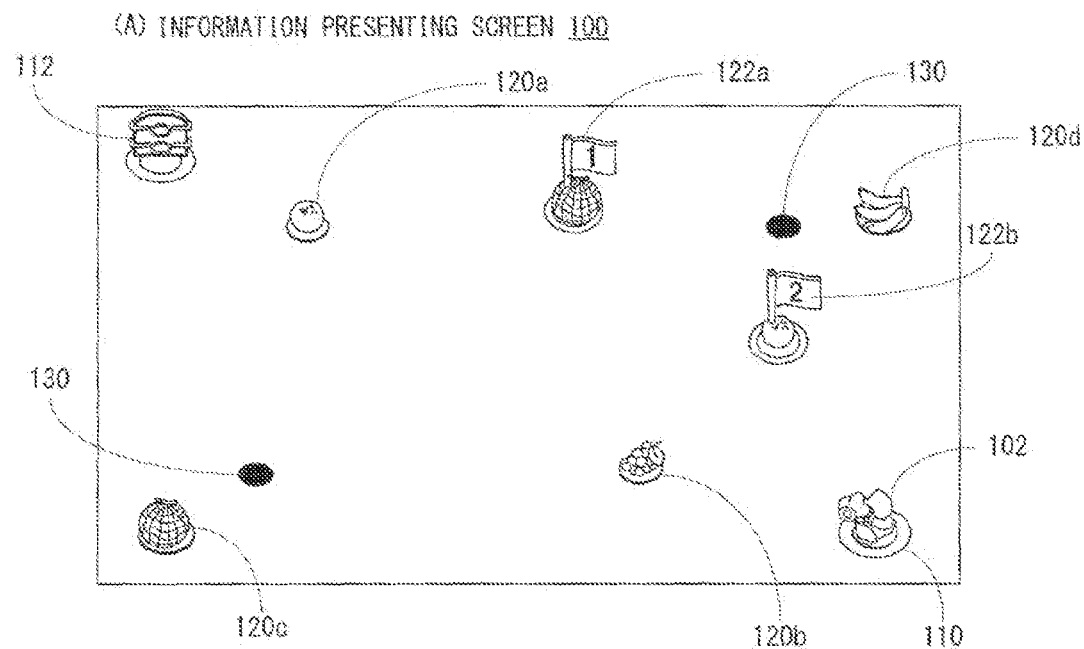
FIG. 5 is a view showing another example non-limiting information presenting screen on the television and another example non-limiting input screen on the input terminal device.
Figure 5:
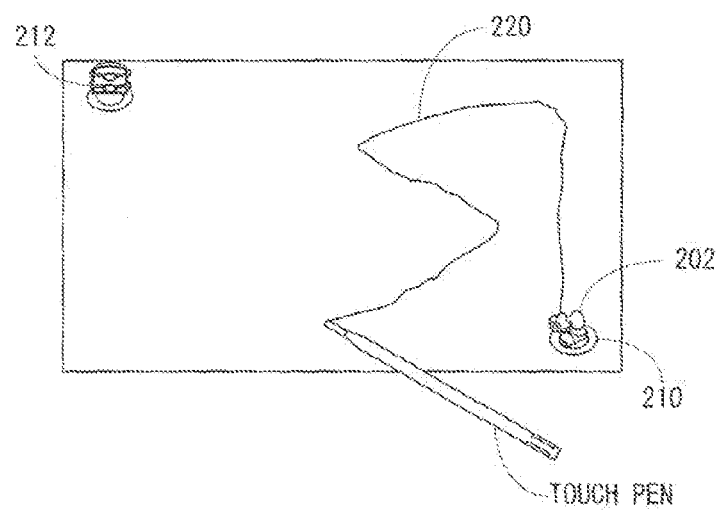

FIG. 5(A) and FIG. 5(B) show examples of the information presenting screen 100 and the input screen 200 in a case that the player is drawing the movement path (in the middle of). Because the information presenting screen 100 shown in FIG. 5(A) is the same as the information presenting screen 100 having been shown in FIG. 4(A), a duplicate description will be omitted here. That is, in drawing the movement path 220 in the input screen 200, except a case that the background described later is changed, no change occurs in the content of the information presenting screen 100. That is, in drawing the movement path 220, in a case that the information presenting screen 100 is to be drawn, the movement path 140 (see FIG. 6(B)) is not displayed on the information presenting screen 100. A reason why the movement path 140 is not displayed on the information presenting screen 100 in a case that the movement path is drawn by the player in the input screen 200, if the movement path 140 is displayed, by using such a movement path as a guide, it becomes very easy to draw the movement path 220 in the input screen 200.

In addition, in this embodiment, there is an occasion that a state or period until the start of movement of the player character 102 is designated from a state that the player can draw the movement path 220 is called as "drawing mode". In contrast, there is an occasion that a state or period from the start of the movement of the player character 102 is designated until the player character 102 terminates its movement is called as "moving mode".

On the other hand, in the input screen 200 shown in FIG. 5(B), the movement path 220 that is drawn according to an operation of the player is displayed. For example, the player traces on the LCD 51 (touch panel 52) by a touch pen or a finger of the player himself/herself. In this embodiment shown, the movement path 220 is drawn based on a plurality of touch positions (points) stored according to a time series. However, the input terminal device 7 only detects the coordinate data and transmits the same to the game apparatus 3, and the rendering process of the input screen 200 including the movement path 220 is performed at a side of the game apparatus 3.

Figure 6:
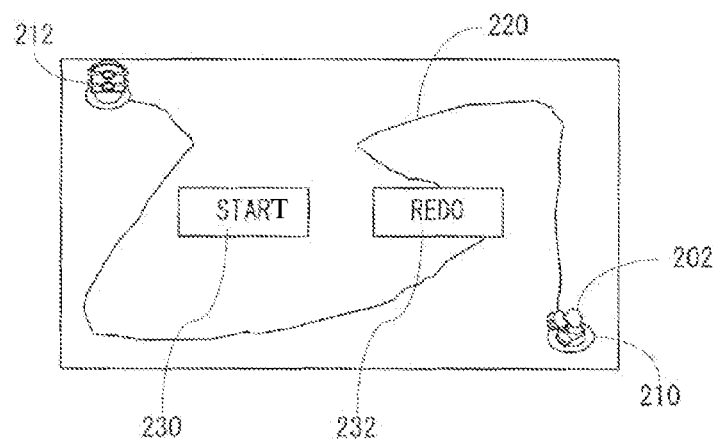
FIG. 6 is a view showing a still another example non-limiting input screen on the input terminal device and a still another example non-limiting information presenting screen on the television.
Figure 6:
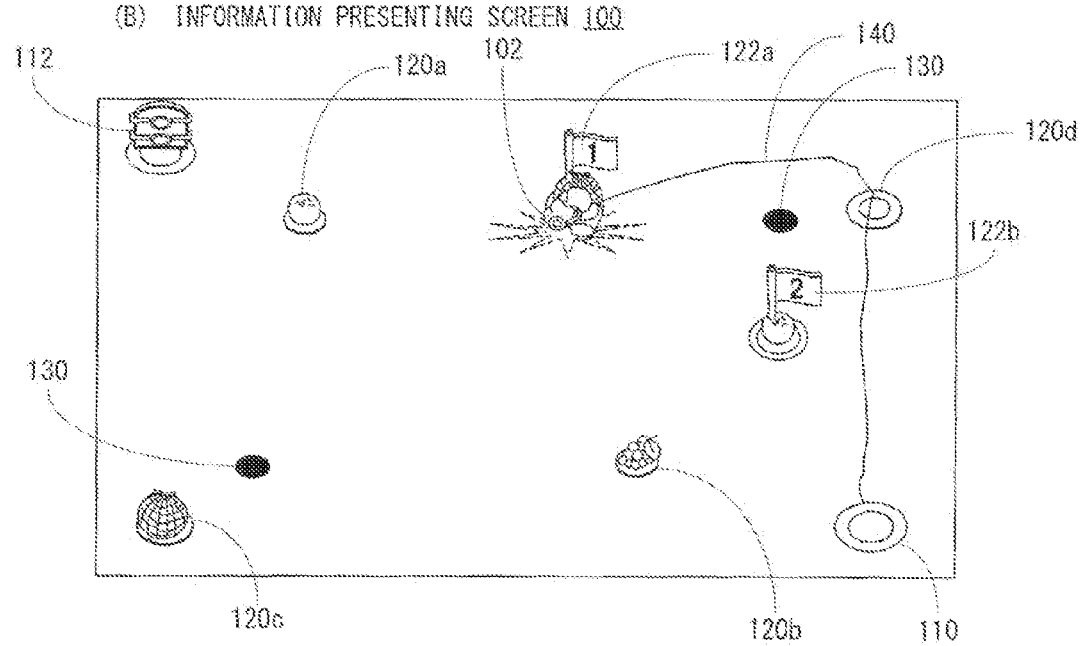

If the movement path 220 from the start to the goal is drawn in the input screen 200, as shown in FIG. 6(A), in a front side of the input screen 200, a button image 230 and a button image 232 are displayed. The button image 230 is provided to start the movement of the player character 102, and the button image 232 is provided to do again (redo) the drawing of the movement path 220.

If the button image 230 is touched, an instruction to start the movement (operation data indicative of the start of movement) is applied from the input terminal device 7 to the game apparatus 3. In response thereto, the game apparatus 3 starts the movement of the player character 102. Specifically, as shown in FIG. 6(B), the player character 102 moved in accordance with the movement path 220 that the player draws in the input screen 200 is displayed in the information presenting screen 100, and the movement path 140 corresponding to the movement path 220 is displayed in accordance with the movement of the player character 102.

Furthermore, during the movement, the collision determination between the player character 102 and the normal object 120, the order object 122, the obstacle object 130 and the goal object 112 is performed.

In addition, since the collision determination processing of the character or the object is well-known, a detailed description thereof will be omitted here.

If the player character 102 comes into collision with the normal object 120, the player character 102 gets the normal object 120. In this embodiment shown, the player character 102 eats the normal object 120 that is a fruit.

If the player character 102 collides with the order object 122, it is determined whether or not the number indicated by the order object 122 shows the correct order, and in a case of being a correct order, the player character 102 gets (eats) the order object 122. On the other hand, in a case of not being a correct order, it is determined that the player character 102 has made a mistake, and the remaining lives of the player character 102 is reduced.

Furthermore, in a case that the player character 102 is brought into contact with the obstacle object 130, it is also determined that the player character 102 has made a mistake, and the remaking lives of the player character 102 is reduced.

Then, if the player character 102 comes into collision with the goal object 112, the movement of the player character 1.02 is ended (stopped), and a determining process on whether or not the stage or level can be cleared.

In addition, in an example shown in FIG. 6(B), if the player character 102 is not brought into collision with (contact with) the obstacle object 130, and the player character 102 gets the normal objects 120a, 120b, 120c and 120d, and the player character 102 gets the order objects 122a and 122b in the order shown by the numbers of the order objects 122a and 122b, and then the player character 102 arrives at the goal object 112, the stage or level becomes to be cleared.

If the player character 102 moves, the vital value is reduced according to a moving amount. For example, a magnitude of the vital value to be subtracted in accordance with a predetermined moving amount (the number of dots) is defined at a predetermined value. Therefore, if the vital value of the player character 102 becomes equal to or less than zero (0) during the movement, it is also determined that the player character 102 has made a mistake, and the remaining lives of the player character 102 is reduced. In addition, the vital value of the player character 102 is added with a predetermined value al every time that the player character 102 gets the normal object 120 or the order object 122.

In this embodiment, the vital value of the player character 102 is set and the vital value is reduced in response to the movement of the player character 102. This is to exclude a play that a programmer or developer having not intended come by restricting the length of the movement path 222 that the player can draw and thus the player character 102 can move. For example, the moving path is drawn by a wavy line that evades the obstacle object 130 and drawn in a whole screen to clear the game can be excluded. By such a restriction, it is possible for the player to consider whether or not the movement path is correctly drawn.

In FIG. 4(A), FIG. 5(A) and FIG. 6(B), only the obstacle object 130 that is statically arranged at predetermined positions such as a black hole or a pit hole, hut not limited. An obstacle object 130 that is dynamically changed in its position or an obstacle object 130 that a state thereof is changed may be arranged.

Figure 7:
FIG. 7 is a view showing an example non-limiting obstacle object and an example non-limiting background pattern.
Figure 7:
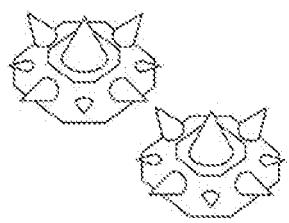
Figure 7:
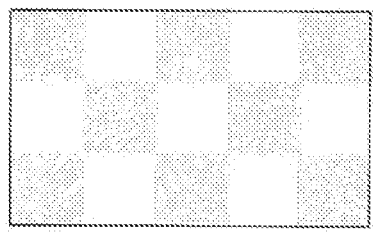
Figure 7:
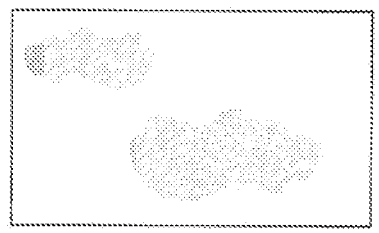

One example of an obstacle object 130 that the position thereof is dynamically changed is shown in FIG. 7(A). The obstacle object 130 shown In FIG. 7(A) is an object Imitating a bee. The obstacle object 130 moves within the virtual space. For example, in the information presenting screen 100, the obstacle object 130 moves to go and come back in up and down directions or in right and left directions, or moves clockwise or counterclockwise on a predetermined circular orbit within the screen. Then, the stage or level is designed in a manner that the movement path of the obstacle object 130 and the movement path of the player character 102 are intersected to each other or laid on another.

Therefore, it is necessary for the player not only to draw the movement path 220 capable of evading the obstacle object 130 being statically arranged but also to control the timing that the movement of the player character 102 is started to evade a collision with the dynamic obstacle object 130.

In addition, although a detailed description will be omitted, the player character 102 is moved at a constant speed, for example.

One example of an obstacle object 130 that a state thereof is changed is shown in FIG. 7(B). The obstacle object 130 shown in FIG. 7(B) is an object having a plurality of thorns and arranged at a predetermined position within the virtual space. The obstacle object 130 is changed in its state between a state that the thorns are projected and a state that the thorns are retracted. If the player character 102 comes into collision with the obstacle object 130 in a state that the thorns are projected, it is determined that the player character 102 has made a mistake. On the other hand, in a state that the thorns are refracted, even if the player character 102 is brought into contact with the obstacle object 130, it is not determined that the player character 102 has made a mistake and can pass the above thereof.

For example, if the player character 102 collides with a predetermined, object (a lever object, not shown), the obstacle object 130 in a state that the thorns are projected is changed to in a state that the thorns are retracted, and inversely, the obstacle object 130 in the state that the thorns are retracted is changed to in the state that the thorns are projected. Therefore, the player needs to consider the change of the state of the obstacle object 130 in drawing the movement path 220.

Therefore, it is possible to produce stages that the degree of difficulty is freely changed, for example, from an easy stage that the obstacle object 130 is not displayed to a difficult stage that a static obstacle object 130, a dynamic obstacle object 130 and an obstacle object 130 a state of which is changed are displayed.

Furthermore, although not shown in the above-described information presenting screen 100 and the input screen 200, a background is also displayed in these screens 100 and 200. In this embodiment, the background can be classified into a background with no pattern, a background with a pattern not changed, and a background with a pattern that is changed. In addition, a case that the pattern exists is classified into a case that the pattern is clear and a case that the pattern is not clear.

In FIG. 7(C), as an example of the background with the pattern not changed, for example, a background that a lattice pattern is represented by a shade of color; however, the pattern is not limited to the lattice pattern, and a pattern having no regularity may be represented. Therefore, it is possible to display a background that the pattern is not clear by making the difference of light and shade of color smaller or by representing a pattern with no regularity.

Furthermore, in FIG. 7(D), as an example of a background with a pattern that is changed, a background that the pattern is changed by laying a shadow of a virtual cloud and by moving the shadow in synchronous with a movement of the virtual cloud. For example, if the number of stars in a starry sky is decreased, it is possible to display the background that the pattern is clear, and inversely, if the number of stars in a starry sky is increased, it is possible to display the background that the pattern is not clear.

Although not shown, it is possible to display a background that the pattern is changed by displaying a background of a starry sky and by blinking the stars. In addition, if the stars are not blinked, it is possible to display the background that the pattern exists but not changed.

A reason why the pattern is thus applied to the background is that the position on the input screen 200 corresponding to the position on the information presenting screen 100 can be easily grasped. Therefore, it is possible to make difficult to understand the position on the input screen 200 corresponding to the position on the information presenting screen 100 by removing a pattern or by changing a pattern, and therefore, the degree of difficulty in drawing the moving path can be increased. For example, in a case that the lattice pattern shown in FIG. 7(C) is displayed, the position on the input screen 200 corresponding to the position on the information presenting screen 100 is relatively easy to be grasped, and thus, it is possible to say that the degree of difficulty in drawing the moving path is relatively low. In addition, it is possible to consider that the smaller size of the lattice, the higher degree of difficulty.

Therefore, by changing a displaying manner of the background, the degree of difficulty of the stage can be also changed.

Figure 8:
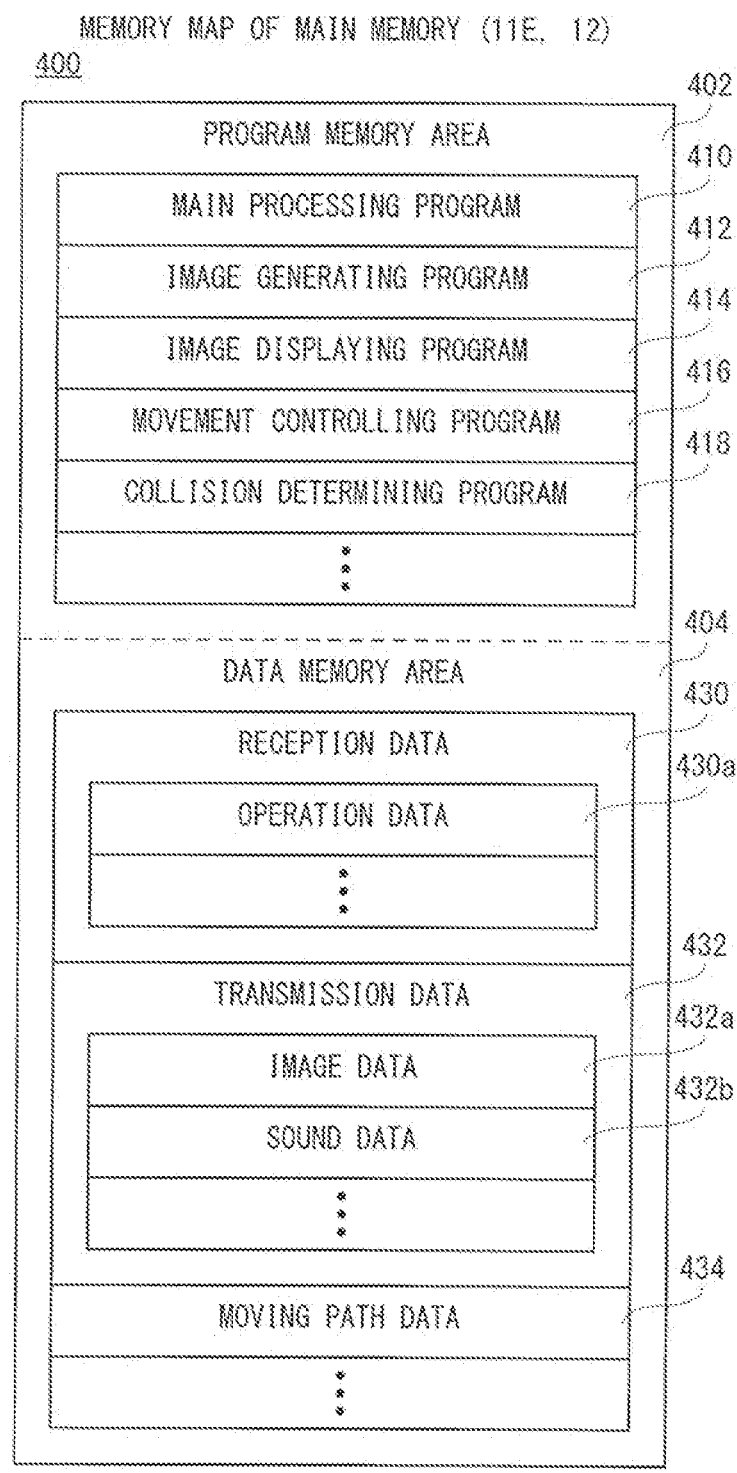
FIG. 8 is a view showing an example non-limiting memory map of a main, memory shown in FIG. 2.

FIG. 8 shows an example non-limiting memory map 400 of the main memory (11e, 12) of the game apparatus 3 shown in FIG. 2. As shown in. FIG. 8, the main memory (11e, 12) includes a program memory area 402 and a data memory area 404. In the program memory area 402, an information processing program such as a game program, etc. is stored. For example, at a proper timing after powering the game apparatus 3 on, a part or all of tire game programs are read from the optical disk 4 and stored in the main memory (11e, 12).

Here, the game program may be acquired not from the optical disk 4 but from the flash memory 17 or external devices (via the Internet, for example) of the game apparatus 3. Furthermore, a part of the programs included in the game program 410 may be stored in advance in the game apparatus 3.

In this embodiment, the game program is constituted by a main processing program 410, an image generating program 412, an image displaying program 414, a movement controlling program 416, a collision determining program 418, etc.

Figure 10:
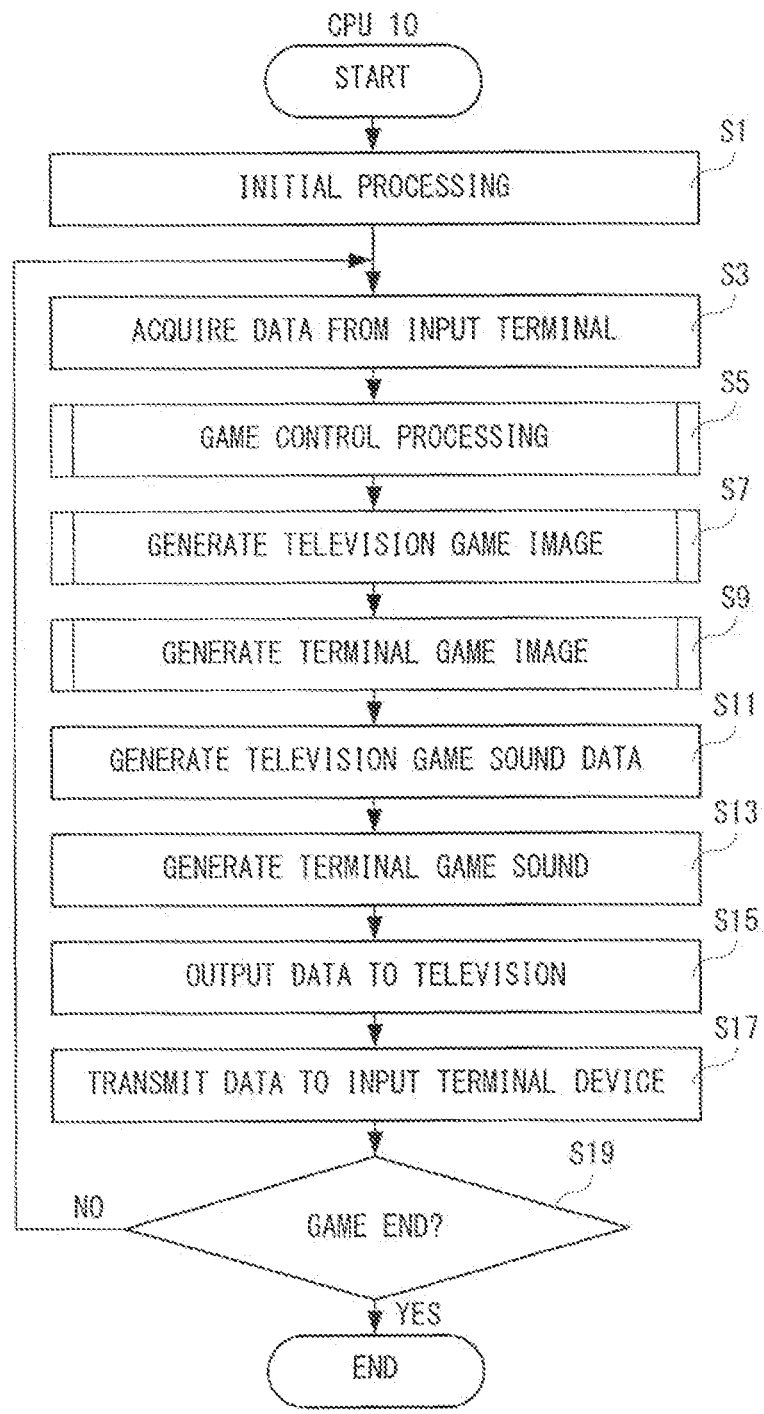
FIG. 10 shows an example non-limiting flowchart, showing game entire processing by the CPU of the game apparatus shown in FIG. 2.

The main processing program 410 is a program for performing a process of a main routine for a virtual game (a whole process in FIG. 10). The image generating program 412 is a program for generating (FIG. 13) a television game image and for generating (FIG. 14) a terminal game image by utilizing data such as polygon data, texture data and so on.

The image displaying program 414 is a program for displaying the image data of the television game image that is generated according to the image generating program 412 on the television 2. Furthermore, the image displaying program 414 is also a program for transmitting the image data, of the terminal game image generated according to the image generating program 412 to the input terminal device 7.

The movement controlling program 416 is a program for controlling, in response to a movement start instruction by the player, controlling the movement of the player character 102 in the information presenting screen 100 according to the moving path 220 drawn on the input terminal device 7.

The collision determining program 418 is a program, for determining a collision between the player character 102 and various kinds of objects (112,120, 122,130). In this embodiment shown, a collision between the player character 102 and various kinds of the objects (112, 120, 122, 130) is determined, but not limited to such a determination. It may be determined whether or not a point on the movement path 140, that is, a position corresponding to a position that the player touch-inputs corresponds to the positions of various kinds of the objects (112, 120, 122, 130). In this case, the positions of various kinds of the objects (112, 120, 122, 130) mean positions included within a predetermined range (displaying range of an object, for example) which includes a displaying position (positional coordinates) of the corresponding objects (112, 120, 122, 130), for example.

In addition, in the program storage area 402 is further stored with a communication program, a sound generating program, a sound outputting program, a back-up program and so on.

In the data memory area 404, reception data 430, transmission data 432, moving path data 434, etc. are stored.

The reception data 430 is various kinds of data received from the input terminal device 7. The reception data 430 includes operation data 430a. In a case that a plurality of input terminal devices 7 are connected to the game apparatus 3, a plurality of sets of the operation data 430a are stored in correspondence with the respective input terminal devices 7.

The operation data 430a is data indicating an operation performed on the input terminal device 7 by the user, and including, as described above, the operation button data, the stick data and the touch position data; however, the operation data 430a may be data indicating an operation by the user who operates the input terminal device 7, and may be data including only one of the above-described data. The operation data 430a is transmitted from the input terminal device 7, and received by the game apparatus 3 and stored in the main memory (11e, 12) thereof.

In addition, a predetermined, number of operation data may be stored sequentially from newest data (last acquired data) in the main memory (11e, 12).

The transmission data 432 includes the image data 432a, the sound data 432b and so on. The image data 432a is generated during the game processing, and includes image data of the terminal game image output by the input terminal device 7 (the game image on the input screen 200), etc., image data of a menu image output by the input terminal device 7 by a menu function, and so on. The sound data 432*b* is generated during the grams processing, and includes sound data of the terminal game sound output by the input terminal device 7 and sound data for BGM and sound effects.

The movement path data 434 is data for the movement path 220 input on the input screen 200, and specifically, touch coordinates data about a plurality of touch coordinates included in the movement path 220, in addition, the touch coordinates data, is included in the operation data 430*a*, and in the drawing mode, the touch coordinates data included in the received operation data 430*a* is stored as the moving path data 434 in addition, to the touch coordinates data included in the moving path data 434. Furthermore, the plurality of touch coordinates included in the movement path 220 are aligned in accordance with a time series.

Although not shown, the data storage area 404 is further stored with data utilized in game entire processing (FIG. 10) described later, and provided with other flags and counters (timers). In addition, the data utilized in the whole game processing include various kinds of data utilized in the game processing such as data indicative of various kinds of parameters being set for various kinds of characters or objects appearing in the virtual game.

Figure 9:
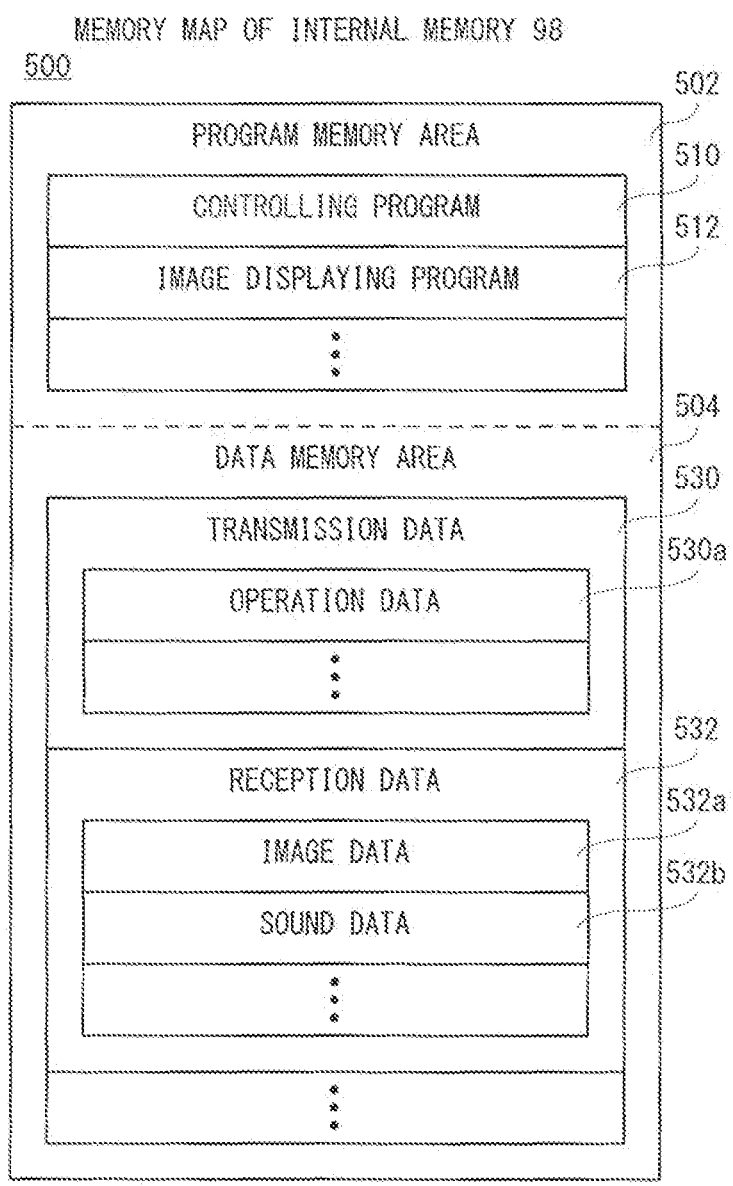
FIG. 9 is a view showing an example non-limiting memory map of an internal memory shown in FIG. 3.

FIG. 9 shows an example non-limiting memory map 500 of an internal memory 98 of the input terminal device 7 shown in FIG. 4. As shown in FIG. 9, the internal memory 98 includes a program memory area 502 and a data memory area 504.

In the program memory area 502, programs such as a control program 510, an image displaying program 530, etc. are stored. The control, program 510 is a program for executing the entire processing of the input terminal device 7. The image displaying program 512 is a program for displaying (outputting) on the LCD 51 the image data 532*a* included in the reception data 532 received from the game apparatus 3. In addition, in the program memory area 502, a sound outputting program, getcare stored.

In the data memory area 504, transmission data 530 and reception data 532 are stored.

The transmission data 512 includes operation data 530*a*. This is the same in content as the operation data 430*a* contained in the above-described reception data 430, and therefore, a duplicate description is omitted.

Similarly, the reception data 532 includes image data 532*a*, sound data 532*b*, etc. These are the same in content as the image data 432*a* and the sound data 432*b* contained in the above-described transmission data 432, and therefore, a duplicate description is omitted.

Although illustration is omitted, in the data memory area 504, other data necessary for execution of the control program 510 is stored, and provided, with other flags and counters (timers).

FIG. 10 shows an example non-limiting flowchart-showing game entire processioning by the CPU 10 provided in the game apparatus 3 shown in FIG. 2. Here, processing in each step of the flowchart shown in FIG. 10 (and FIG. 11-FIG. 14 described later) is mere examples, and the order or sequence of processing in the respective steps may be interchanged if a similar result can be obtained. Also, values of the variables and threshold values utilized in the determining step are mere examples, and other values may he adopted as required. Furthermore, in the embodiment, a description will be made that the CPU 10 executes the processing in the respective steps of the flowchart shown in FIG. 10-FIG. 14, but a processor and/or a dedicated circuit other than the CPU 10 may execute a part of the processing.

When the power of the game apparatus 3 is turned on, prior to execution of the game entire processioning, the CPU 10 executes an activation program stored in a boot ROM not shown to thereby initialize each unit such as the main memory (11*e*, 12), etc. Then, the CPU 10 reads the game program 410 stored in the optical disk 4 into the main memory (11*e*, 12) to start execution of the game program 410.

When starting the game entire processioning, the CPU 10 executes initial processing in a step S1. The initial processing is processing of constructing a virtual game space, arranging each object appearing in the game space at their initial position, and setting initial values of various parameters utilized in the game processing, for example.

Subsequently, in a step S3, the CPU 10 acquires various data transmitted from the input terminal device 7, and in a step S5, the CPU 10 executes the game control processing described later (FIG. 11 and FIG. 12), In a next step S7, the CPU 10 and the GPU 11*b* executes generating process (FIG. 13) of a television, gam image to be displayed on the television 2. Briefly described, the CPU 10 and the GPU 11*b* reads the data indicating the result of the game control processing in the step S5 from the main memory (11*e*, 12) and reads the data necessary for generating a game image from the VRAM 11*d*, to thereby generate the television game image.

As described above, in a case that the player inputs a movement path 220 using the Input terminal device 7, i.e. in the drawing mode, the drawing process of the moving path 140 is not performed because the moving path 140 is not displayed on the Information presenting screen 100.

Although a detailed description is omitted here, in the drawing mode, the drawing processing for the movement path 140 is performed, but the drawn movement path 140 may be masked, and then, in the moving mode, the mask may be removed according to the movement of the player character 102.

In a next step S9, the CPU 10 and the CPU 11*b* execute generating process (FIG. 14) of a terminal game image to be displayed on the input terminal device 7. Briefly described, similar to the television game Image described above, the terminal game image is also generated, by reading from the main memory (11*e*, 12) the data indicating a result of the game control processing in the step S5 and by reading from the VRAM 11*d* the data necessary for generating the game image.

However, as described above, in the drawing mode, the start object 110 and the goal object 112 are displayed on the input screen 200, but the normal object 102, the order object 104 and the obstacle object 130 are not displayed, and in response to the touch input by the player, the moving path 220 is displayed. Furthermore, in the moving mode, instead of the input screen 200, a screen on which a message "see television", for example, is written is displayed on the LCD 51.

Subsequently, in a step S11, the CPU 10 generates a television game sound to be output to the speaker 2*a* of the television 2. That is, the CPU 10 makes the DSP 11*c* generate a game sound depending on the result of the game control, processing in the step S5.

Next in a step S13, the CPU 10 generates a terminal game sound to be output to the speaker 87 of the Input terminal device 7. That is, the CPU 10 makes the DSP 11*c* generate a game sound depending on the result of the game control processing in the step S5.

It should be noted that in a case that the television game sound and the terminal game sound are identical with each other, the processing in the step S13 need not be executed.

Subsequently, in a step S15, the CPU 10 outputs the game image and the game sound to the television 2. More specifically, the CPU 10 transmits the image data of the television game image stored in the VRAM 11d and the sound data of the television game sound generated by the DSP 11c in the step S11 to the AV-IC 15.

Next, in a step S17, the CPU 10 transmits the game Image and the game sound to the input terminal device 7. More specifically, the image data of the terminal game image stored in the VRAM lid and the sound data generated by the DSP 11c in the step S13 are transmitted to the codec LSI 86 by the CPU 10 and subjected to predetermined compression processing by the codec LSI 86 in, addition, the data of the image and sound to which the compression processing is subject are transmitted to the input terminal device 7 by the terminal communication module 28 via the antenna 29. In the input terminal device 7, the data of the image and the sound transmitted from the game apparatus 3 are received by the wireless module 90, and subjected to predetermined expansion processing by the codec LSI 86. The image data on which the expansion processing is performed is output to the LCD 51, and the sound data on which the expansion processing is performed is output to the sound IC 88.

Then, in a step S19, the CPU 10 determines whether or not the game is to be ended. The determination in the step S19 is performed based on whether or not the game is over, or whether or not the player performs an instruction of suspending the game, for example. In addition, it is determined whether or not the game is over based on whether or not the remaining lives become zero (0) due to the mistake, for example.

If "NO" is determined in the step S19, that is, if the game is not to be ended, the process returns to the step S3. On the other hand, if "YES" is determined in the step S19, that is, if the game is to be ended, the game entire processing is ended.

Figure 11:
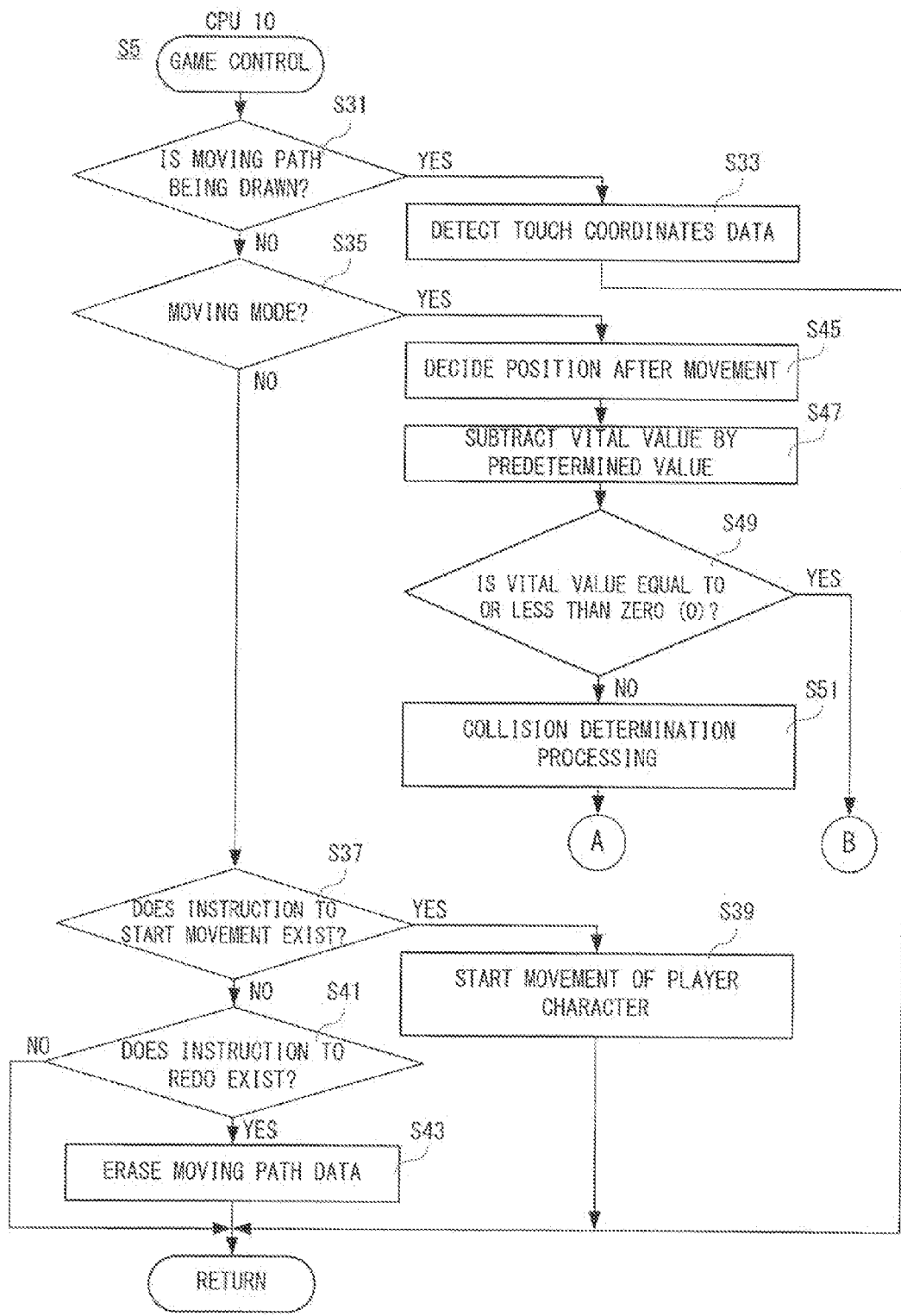
FIG. 11 is a flowchart showing a part of an example non-limiting game controlling processing by the GPU of the game apparatus shown in FIG. 2.
Figure 12:
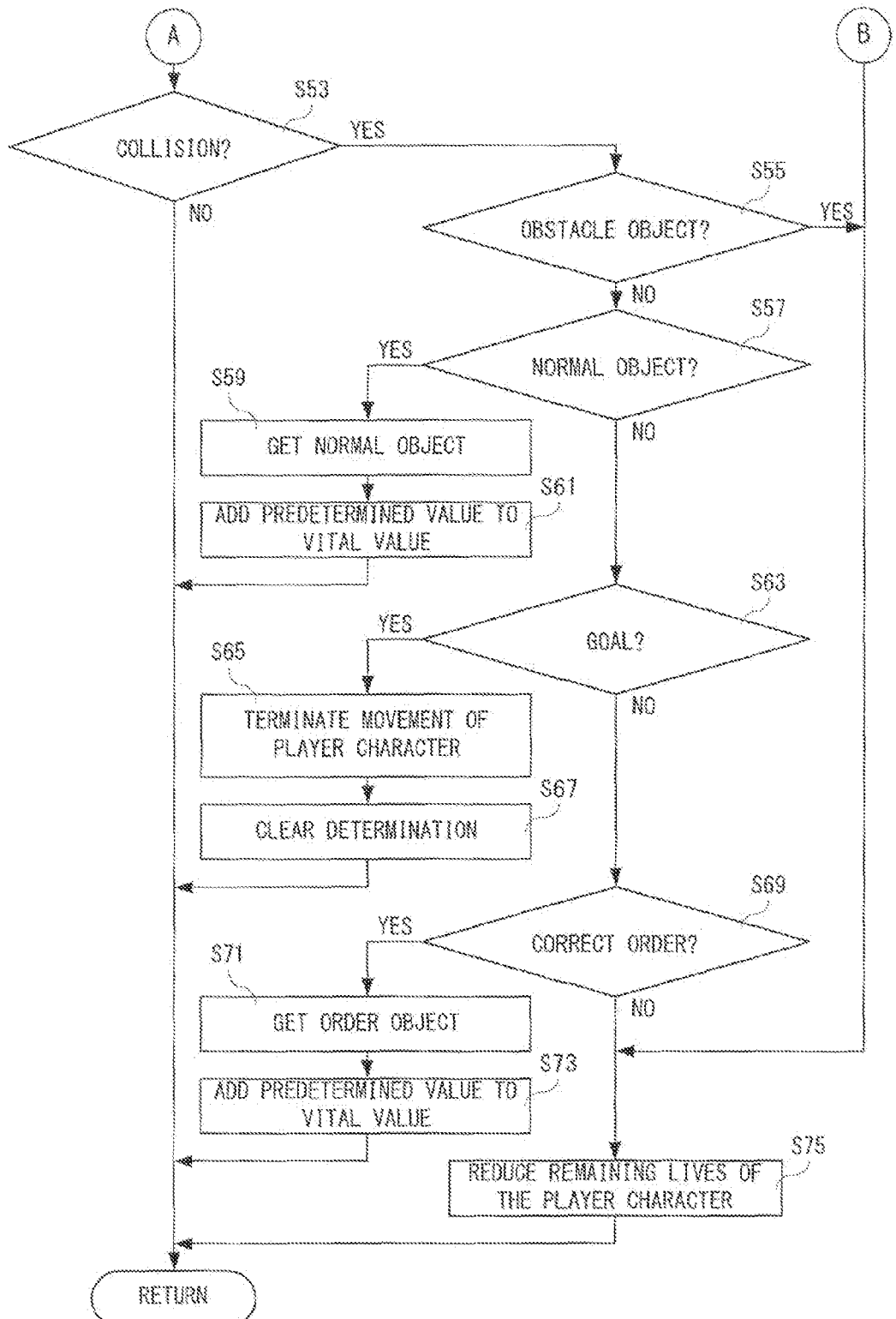
FIG. 12 is a flowchart showing a secondary part of the example non-limiting game controlling processing of the CPU of the game apparatus shown in FIG 2.

FIG. 11 and FIG. 12 are flowcharts showing an example non-limiting game controlling process in the step S5 shown in FIG. 10. As shown in FIG. 11, the CPU 10 determines, upon starting the game controlling process, whether or not the movement path 220 is being drawn in a step S31. Here, the CPU 10 determines whether the button image 230 is not turned-on in the drawing mode after the virtual game is started and the information presenting screen 100 is displayed.

If "YES" is determined in the step S31, that is, if the movement path 220 is now being drawn, in a step S33, the touch coordinates data is detected, and the process returns to the entire processing shown in FIG. 10. Therefore, in the entire processing, based on the touch coordinates data, the movement path 220 is displayed on the input screen 200.

On the other hand, if "NO" is determined in the step S31, that is, the movement path 220 Is not being drawn, in a step S35, it is determined whether or not in the moving mode. If "NO" Is determined in the step S35, that is, in the drawing mode, in a step S37, it is determined whether or not an instruction to start the movement exists. Here, the CPU 10 determines whether or not the button image 230 is touched by referring to the operation data 430a.

If "YES" Is determined in the step S37, that is, if the instruction for the movement start exists, in a step S39, the movement of the player character 102 is started, and then the process returns to the entire processing. That is, in the step S39, the CPU 10 sets the moving mode. On the other hand, if "NO" is determined in the step S37, that is, if no instruction for the movement start exists, in a step S41, it is determined whether or not there is an instruction to redo. If "NO" is determined in the step S41, that is, if the instruction for redoing does not exist, the process returns to the entire processing with no action. On the other hand, if "YES" is determined in the step S41, that is, if the instruction to redo exists, in a step S43, the moving path data 434 is erased, and then, the process returns to the entire processing.

IF "YES" is determined in the step S35, that is, if in the moving mode, in a step S45, a position of the player character 102 after movement is decided. As described above, since the player character 102 is moved with the constant speed, for example, on the movement path 140 from the start object 110 to the goal object 112, positions that a distance (the number of dots) that the player character 102 moves during one (1) frame (frame is a unit time for screen renewal (1/60seconds)) becomes constant are calculated.

In a next step S47, the vital value of the player character 102 is subtracted by a predetermined value. Then, in a step S49, it is determined whether or not the vital value is equal to or less than zero (0). If "YES" is determined in the step S49, that is, if the vital value becomes equal to or less than zero (0), the process proceeds to a step S75 shown in FIG. 12. On the other hand, if "NO" is determined in the step S49, in a step S51, a collision determination processing is performed, and then, the process proceeds to a step S53 shown in FIG. 12.

Although a detailed description is omitted here, in the step S51, the CPU 10 determines whether or not a polygon for collision determination which is set on the moving path 140 (a line object) collides with a polygon for collision determination set to the player character 104.

The CPU 10 determines, after the CPU 10 performs the collision determining process, as shown in FIG. 12, in the step S53, whether or not the player character 102 collides with the objects (120, 122, 130).

If "NO" is determined in the step S53, that is, if the player character 102 does not collide with the object (120, 122, 130), the process returns to the entire processing with no action. On the other hand, if "YES" is determined in the step S53, that is, if the player character 102 collides with the object (120, 122, 130), in a step S55, it is determined whether or not an object with which the player character 102 collides (hereinafter called as "the concerned object") is the obstacle object 130.

If "YES" is determined in the step S55, that is, if the concerned object is the obstacle object 130, the process proceeds to the step S75 as it is. On the other hand, If "NO" is determined in the step S55, that is, if the concerned object is not the obstacle object 130, in a step S57, it is determined whether or not the concerned object is the normal object 120.

In addition, here, in a case that "YES" is determined in the step S53, the process proceeds to the step S75 with no action, but if the player character 102 collides with the obstacle object 130 a state of which is changed, according to the state, it is determined that the player character 102 has made a mistake or not determined that the player character 102 has made a mistake, the player character passing the above. Furthermore, in such a case, in the step S53, it is also determined whether or not the player character 102 collides with the lever object, and if the player character 102 collides with the lever object, the state of the obstacle object 130 is changed.

If "YES" is determined la the step S57, that is, if the concerned object is the normal object 120, in a step S59, the player character 102 gets ("eats" in this embodiment) the normal object 120. Therefore, in the image generating process (S7) after this step, the television game image of the situation that the; player character 102 eats the normal object 120 is generated. That is, a result of the game controlling process is reflected. This is true in steps S65, S71 and S75 described later. Then, in a step S61, a predetermined value is added to the vital value of the player character 102, and then the process returns to the entire processing.

On the other hand, if "NO" is determined in the step S57, that is, if the concerned object is not the normal object 120, in a step S63, it is determined whether or not the concerned object is the goal object 112. If "YES" is determined in the step S63, that is, if the concerned object is the goal object 112, in a step S65, the movement of the player character 102 is terminated, that is, the moving mode is ended, and then. In a step S67, a clear determination processing is performed, and thereafter, the process returns to the entire processing.

In addition, in the clear determination, processing, the CPU 10 determines whether or not the player character 102 obtains or gets all of the normal object 120 and the order object 122.

On the other hand, if "NO" is determined in the step S63, that is, if the concerned object is not the goal object 112, the CPU 10 determines that the concerned object is the order object 122, and in a step S69, it is determined whether or not the order object 122 is of the correct order. Here, the CPU 10 determines whether or not there is another order object having the number smaller than the number displayed on the order object 122 that it is determined, that the player character 102 collides therewith (hereinafter, called as "the concerned order object 122") in the virtual space exists.

If "NO" is determined in the step S69, that Is, if not the correct order, in a step S5, the remaining lives of the player character 102 is reduced, and then, the process returns to the entire processing. On the other hand, if "YES" is determined in the step S69, that is, if the correct order, in a step S71, the player character 102 obtains or gets the concerned order object 122, and in a step S73, a predetermined value is added to the power valued of the player character 102, and then, the process returns to the entire processing.

Figure 13:
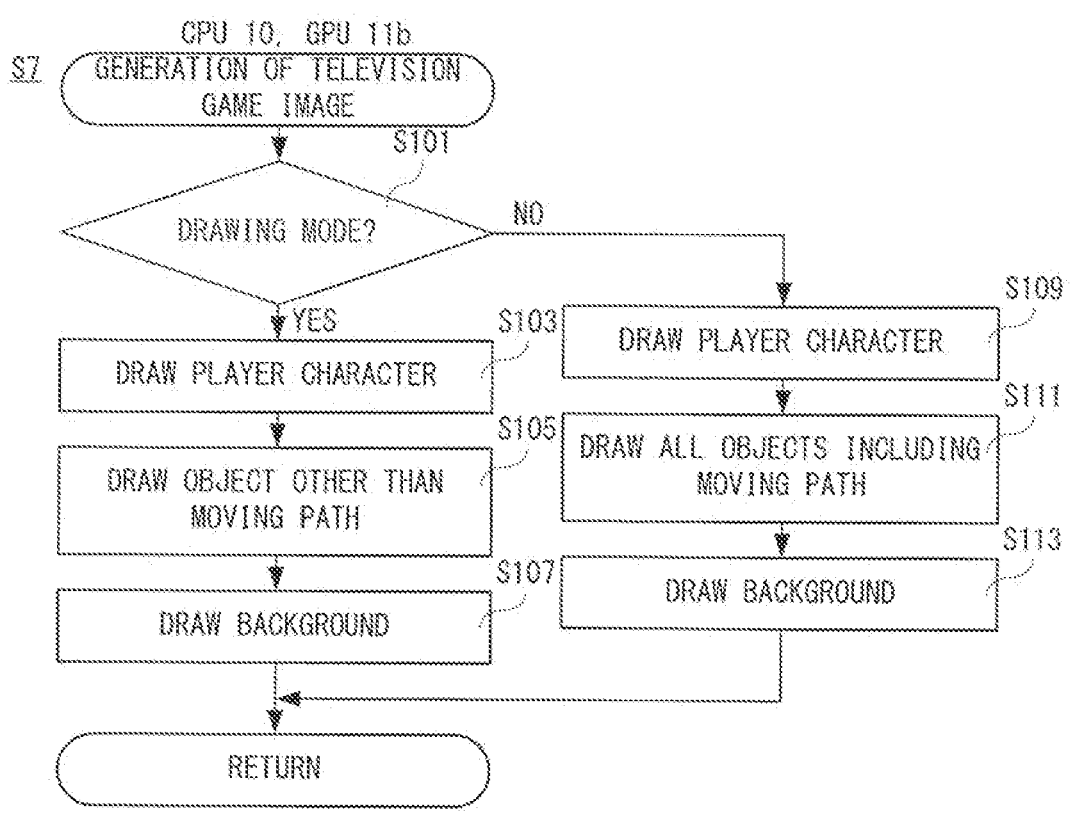
FIG. 13 is a flowchart showing an example non-limiting generating processing of a television game image by the CPU of the game apparatus shown in FIG. 2.

FIG. 13 is a flowchart showing a television game image generation, processing in the step S7 shown in FIG. 10. As shown in FIG. 13, when the generation processing is started, the CPU 10 determines whether or not the draw lug mode is set In a step S101, if "YES" is determined In the step S101, that is, if In the drawing mode, in a step S103, the CPU 10 and the GPU 11b draw the player character 102 at the start position, and in a step S105, draw objects except the moving path 140. That is, in the step S105, the CPU10 and the GPU 11b draw the start object 110, the goal object 112, the normal object 120, the order object 122 and the obstacle object 130, but do not draw the moving path 140, in addition, there is a case that the normal object 120, the order object 122 and the obstacle object 130 are not drawn according to the course (level (stage)). In a step S107, the background is drawn, and then the process returns to the entire processing.

On the other hand, if "NO" is determined in the step S101, that Is, if in the moving mode. In a step S109, the player character 102 is drawn at a current position, and in a step S111, all objects including the moving path 140 are drawn, and in a step S113, the background as drawn, and then, the process returns to the entire processing. In addition, in the step S111, the moving path 140 from the start object 110 to the current position of the player character 102 is drawn.

Figure 14:
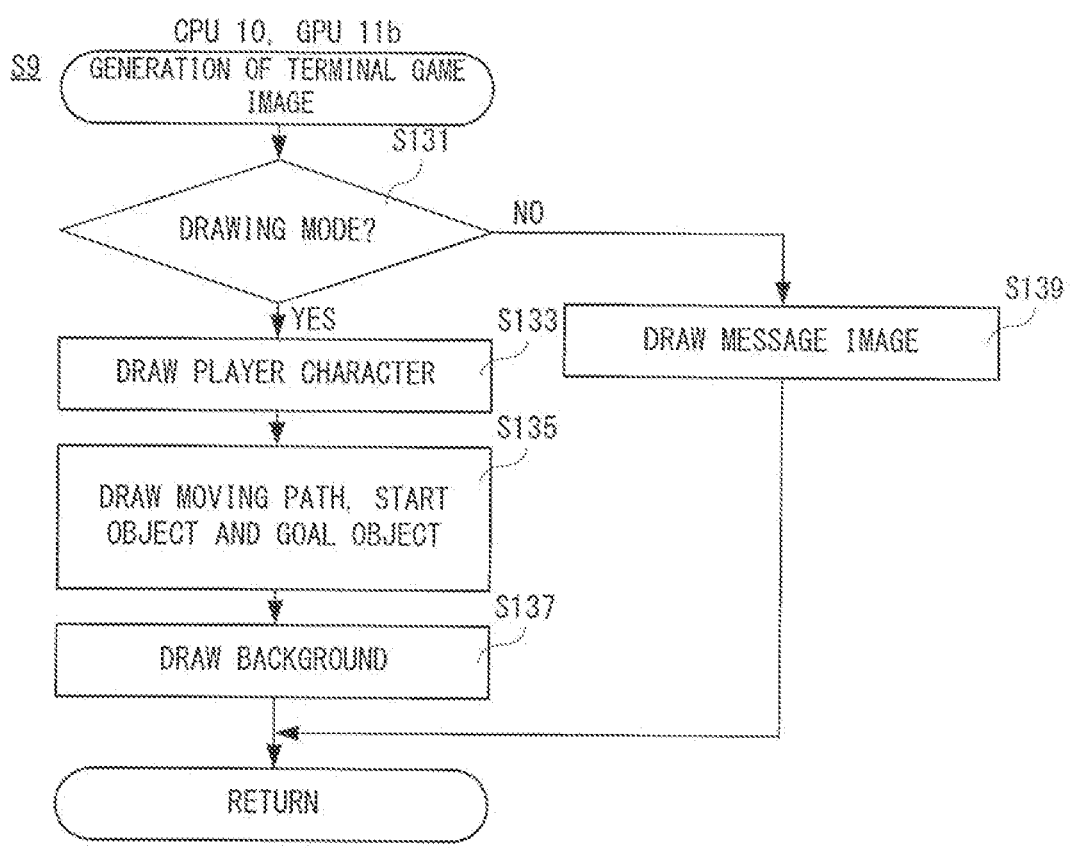
FIG. 14 is a flowchart showing an example non-limiting generating processing of a terminal game image by the CPU of the game apparatus shown in FIG. 2.

FIG. 14 is a flowchart showing the terminal game image generation processing in the step S9 shown In FIG. 10. As shown in FIG. 14, when, the generation processing is started, the CPU 10 determines whether or not the drawing mode Is set in a step S131, if "NO" is determined in the step S131, that is, if in the moving mode, the CPU 10 and the GPU 11b draw the message image making the user see the display apparatus to which the game apparatus 3 is connected (in this embodiment, television 2) in a step S139, and then, the process returns to the entire processing.

On the other hand, if "YES" is determined in the step S131, that is, if in the drawing mode, the CPU 10 and the GPU 11b draw the player character 202 at the start position In a step S133, and in a step S135, draw the moving path 220, the start object 210 and the goal object 212, and draw the background in a step S137, and then, the process returns to the entire processing. In the step S135, the moving path 220 is drawn from the drawing start position, (the position at which the start object 110 is firstly designated) to the current touch position.

According to this embodiment, since an information presenting screen is displayed on one of two separate displaying apparatuses and an input screen on which a part of object out of the objects in the information presenting screen is displayed on the other of the displaying apparatuses, and the moving path for the player character is drawn on the input screen, in the game using the position input, it is possible to enjoy the game while it is considered that the input is correct. Therefore, since the drawing of the moving path is more difficult in comparison with the course being merely traced, it is possible to increase the game's interest and the feeling of refreshment of the game clear.

Furthermore, according to this embodiment, even if the information presenting screen and the input screen are not arranged in parallel with each other, by bearing a role of each screen, it is possible to naturally perform a suitable guide for the line of sight.

Furthermore, according to this embodiment, since the eye estimation of a relative positional relationship is required, it is possible to play the virtual game with using a plurality of screens each having an arbitrary size.

In addition, in this embodiment, by performing the slide operation on the input screen, the moving path is drawn, and the player character is moved according to the moving path, but not limited. For example, by touching a plurality of points, the moving path is decided by the plurality of points (positions) touched, and the player character may be lineally moved in an order of the touched point (position).

In this embodiment, it is determined whether or not the player character moving in accordance with the moving path is brought into contact with the object arranged in the virtual space, but the game controlling process may be performed based on a relationship between the points constituting the moving path, i.e., positions corresponding to the input positions and the object position.

In the above-described embodiments, only a case that the player character is moved on the moving path is described, but other game elements may be added. For example, if the predetermined object is obtained, a part ("tongue", for example) of the player character may be extended to obtain the object existing at the front within the predetermined angle by the tongue, or the player character may become an unchallenged state that the influence by the obstacle object is not affected during the predetermined time period. That is, by the special effects within the virtual space, it is possible to make the player character to easily obtain or get the normal object and the order object, and not to be affected by the obstacle object. In such a case, if is possible to consider not only the moving path for simply obtaining the normal object and the order object but also a way for obtaining them.

Furthermore, in the virtual game of this embodiment, in a case that the remaining lives of the player character remains after making a mistake, at a succeeding gameplay, a locus input previously may be displayed on the terminal game image, which will serve as a reference for trying the game again.

Furthermore, in this embodiment, if the player character collides with the obstacle object when moving, it is determined as a mistake and the remaining lives of the player character 102 is reduced, but it is not necessary to be limited to this. For example, as a result of moving the player character from the start object to the goal object according to the moving path, whether or not the normal object and the order object are obtained or whether or not the player character collides with the obstacle object may be determined.

In addition, the game system shown in the embodiment is only an example. As long as a structure is formed, in which an information presenting screen and as input screen are displayed on separate displaying apparatuses and a moving path can be input on the input screen, it is possible to adopt other structures.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A game system, comprising:
   a first display portion;
   a second display portion separate from the first display portion and provided with an input surface;
   the game system having a processing system including at least one processor, the processing system configured to:
   generate a first image of a virtual space;
   generate a second image of the virtual space, for display on the second display portion having the input surface, in a manner that a drawing of at least a certain target object out of the target objects drawn in the first image is not performed;
   display the first image on the first display portion;
   display the second image on the second display portion having the input surface;
   determine, according to an input based on a two-dimensional coordinate placed on the input surface, whether or not an input position corresponds to a position of the certain target object; and
   perform a game processing according to a determination result of whether or not the input position corresponds to the position of the certain target object.

2. The game system according to claim 1, wherein the processing system is configured to determine, based on a successive position input to the input surface, whether or not an input path from a predetermined start position to a predetermined end position passes positions corresponding to the target objects, and
   decide a game result according to a determination result.

3. The game system according to claim 2, wherein the target object includes a plurality of target objects to be determined, and
   the processing system is configured to determine whether or not the input path passes positions corresponding to respective target objects.

4. The game system according to claim 2, wherein the target object includes a plurality of target objects to be determined and includes a target object that the input path must pass and a target object that the input path must not pass, and
   the processing system is configured to determine whether or not the input path passes a position corresponding to the target object to be passed, and whether or not the input path does not pass a position corresponding to the target object not to be passed.

5. The game system according to claim 4, further comprising a moving object which is drawn in the first image and moves on a path corresponding to the input path, wherein
   the processing system is configured to determine whether or not the moving object moving on the path corresponding to the input path passes the position corresponding to the target object to be passed and whether or not the moving object does not pass a position corresponding to the target object not to be passed.

6. The game system according to claim 5, wherein the target object not to be passed by the moving object includes a target object that changes position.

7. The game system according to claim 5, wherein the target object not to be passed includes a target object that a state thereof is changed between a state that the input path must not pass and a state that the input path may pass.

8. The game system according to claim 5, wherein the processing system is configured to determined whether or not the moving object moving on the path corresponding to the input path passes the position corresponding the target object due to a special effect within the virtual space.

9. The game system according to claim 2, wherein the target object includes a plurality of target objects to be determined, and includes a plurality of target objects to each of which an order that at least the input path must pass is assigned, and
   the processing system is configured to determine at least whether or not the input path passes respective positions corresponding to the plurality of target objects to each of which an order that the input path must pass is assigned in accordance with the order.

10. The game system according to claim 2, wherein the processing system is configured to draw the input path in the second image according to the input to the input surface, and
    the processing system does not draw a path corresponding to the input path in the first image when the input path is drawn in the second image.

11. The game system according to claim 1, wherein the processing system is configured to transmit image data corresponding to the second image to the second display portion in a wireless manner.

12. The game system according to claim 1, further comprising a game apparatus connected to the first display portion and an input terminal device which is connected to the game apparatus in a communication-capable manner and includes the second display portion.

13. The game system according to claim 1, wherein an input image corresponding to input made to the input surface is displayed on the second display portion but omitted from display on the first display portion.

14. The game system according to claim 13, wherein the input image corresponds to a movement path of a virtual object displayed on the second display portion.

15. A game apparatus used in a game system which comprises a first display portion and a second display portion separate from the first display portion and provided with an input surface, the game apparatus configured to:
    generate a first image of a virtual space;
    generate a second image of the virtual space, for display on the second display portion having the input surface, in a manner that a drawing of at least a certain target object out of the target objects drawn in the first image is not performed;
    display the first image on the first display portion;

display the second image on the second display portion having the input surface;

determine, according to an input based on a two-dimensional coordinate placed on the input surface, whether or not an input position corresponds to a position of the certain target object; and perform a game processing according to a determination result of whether or not the input position corresponds to the position of the certain target object.

16. The game apparatus according to claim 15, wherein an input image corresponding to input made to the input surface is displayed on the second display portion but omitted from display on the first display portion.

17. A non-transitory storage medium storing a game program for a game system comprising a first display portion and a second display portion that is separate from the first display portion and provided with an input surface, the game program causes a computer of the game system to:

generate a first image of a virtual space;

generate a second image of the virtual space, for display on the second display portion having the input surface, in a manner that a drawing of at least a certain target object out of the target objects drawn in the first image is not performed;

display the first image on the first display portion;

display the second image on the second display portion having the input surface;

determine, according to an input based on a two-dimensional coordinate placed on the input surface, whether or not an input position corresponds to a position of the certain target object; and perform a game processing according to a determination result of whether or not the input position corresponds to the position of the certain target object.

18. The non-transitory storage medium according to claim 17, wherein an input image corresponding to input made to the input surface is displayed on the second display portion but omitted from display on the first display portion.

19. A game controlling method for a game system comprising a first display portion and a second display portion that is separate from the first display portion and provided with an input surface, a computer of the game system performs features comprising:

generating a first image of a virtual space;

generating a second image of the virtual space, for display on the second display portion having the input surface, by controlling not to draw at least a part of target objects drawn in the first image;

displaying the first image on the first display portion;

displaying the second image on the second display portion having the input surface;

determining, according to an input based on a two-dimensional coordinate placed on the input surface, whether or not an input position corresponds to a position of the part of the target objects; and performing a game processing according to a determination result of whether or not the input position corresponds to the position of the part of the target objects.

20. The game controlling method according to claim 19, wherein an input image corresponding to input made to the input surface is displayed on the second display portion but omitted from display on the first display portion.

\* \* \* \* \*